(12) United States Patent
Ishizuka et al.

(10) Patent No.: US 10,195,641 B2
(45) Date of Patent: Feb. 5, 2019

(54) ELECTROSTATIC POWDER COATING METHOD AND POWDER COATING MATERIAL

(71) Applicant: FUJI XEROX CO., LTD., Tokyo (JP)

(72) Inventors: Takahiro Ishizuka, Kanagawa (JP); Takeshi Agata, Kanagawa (JP); Susumu Yoshino, Kanagawa (JP); Shigeru Seitoku, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 165 days.

(21) Appl. No.: 15/090,885

(22) Filed: Apr. 5, 2016

(65) Prior Publication Data

US 2017/0173626 A1 Jun. 22, 2017

(30) Foreign Application Priority Data

Dec. 18, 2015 (JP) ................. 2015-247990

(51) Int. Cl.
| | |
|---|---|
| *B05D 1/06* | (2006.01) |
| *C09D 5/03* | (2006.01) |
| *C09D 167/02* | (2006.01) |
| *C09D 7/61* | (2018.01) |
| *C09D 7/62* | (2018.01) |
| *C08K 9/06* | (2006.01) |
| *C08K 3/22* | (2006.01) |
| *B05D 3/02* | (2006.01) |

(52) U.S. Cl.
CPC ............... *B05D 1/06* (2013.01); *C09D 5/033* (2013.01); *C09D 7/61* (2018.01); *C09D 7/62* (2018.01); *C09D 167/02* (2013.01); *B05D 3/0254* (2013.01); *B05D 2601/20* (2013.01); *B05D 2601/24* (2013.01); *C08K 9/06* (2013.01); *C08K 2003/2227* (2013.01); *C08K 2003/2241* (2013.01)

(58) Field of Classification Search
None
See application file for complete search history.

(56) References Cited

U.S. PATENT DOCUMENTS

| | | | |
|---|---|---|---|
| 6,130,281 A | 10/2000 | Seo et al. | |
| 6,864,316 B1* | 3/2005 | Iwakiri | C09D 127/12 525/111 |
| 2003/0026993 A1* | 2/2003 | Agawa | C09D 133/14 428/413 |
| 2003/0065103 A1* | 4/2003 | Chou | C09D 123/0876 525/330.2 |
| 2003/0113445 A1* | 6/2003 | Martin | A61K 9/2893 427/180 |
| 2004/0147680 A1* | 7/2004 | Sugimoto | C08L 23/10 525/240 |
| 2012/0040120 A1* | 2/2012 | Schwalm | C08F 290/067 428/36.9 |

FOREIGN PATENT DOCUMENTS

| | | |
|---|---|---|
| JP | H08-170032 A | 7/1996 |
| JP | H08-295827 A | 11/1996 |
| JP | H10-231446 A | 9/1998 |
| JP | 2004-162021 A | 6/2004 |
| JP | 2006-111853 A | 4/2006 |
| JP | 2015-183092 A | 10/2015 |

* cited by examiner

*Primary Examiner* — Michael P. Rodriguez
(74) *Attorney, Agent, or Firm* — Oliff PLC

(57) ABSTRACT

An electrostatic powder coating method includes spraying a charged powder coating material including powder particles that contain a thermosetting resin and a thermosetting agent, and an external additive that includes oxide particles containing at least one of titania and alumina to electrostatically attach the powder coating material to an object to be coated, and heating the powder coating material that is electrostatically attached to the object to be coated to thereby form a coating film, wherein a content Ac of the oxide particles in the powder coating material that is electrostatically attached to the object to be coated and a content Ao of the oxide particles in the powder coating material before being sprayed satisfy a relationship of Expression: $Ao \times 0.80 \leq Ac \leq Ao \times 1.20$.

17 Claims, No Drawings

ELECTROSTATIC POWDER COATING METHOD AND POWDER COATING MATERIAL

CROSS-REFERENCE TO RELATED APPLICATIONS

This application is based on and claims priority under 35 USC 119 from Japanese Patent Application No. 2015-247990 filed Dec. 18, 2015.

BACKGROUND

1. Technical Field

The present invention relates to an electrostatic powder coating method and a powder coating material.

2. Related Art

Recently, in a powder coating technology using a powder coating material, the discharge amount of a volatile organic compound (VOC) is reduced in a coating step, and the powder coating material which has not been attached to an object to be coated is collected after coating and is able to be reused, and thus, the powder coating technology has attracted attention from the viewpoint of the global environment. For this reason, various powder coating materials have been studied.

SUMMARY

According to an aspect of the invention, there is provided an electrostatic powder coating method, including:

spraying a charged powder coating material including powder particles that contain a thermosetting resin and a thermosetting agent, and an external additive that includes oxide particles containing at least one of titania and alumina to electrostatically attach the powder coating material to an object to be coated; and heating the powder coating material that is electrostatically attached to the object to be coated to thereby form a coating film, wherein a content Ac of the oxide particles in the powder coating material that is electrostatically attached to the object to be coated and a content Ao of the oxide particles in the powder coating material before being sprayed satisfy a relationship of Expression: $Ao \times 0.80 \leq Ac \leq Ao \times 1.20$.

DETAILED DESCRIPTION

Hereinafter, exemplary embodiments which are an example of the invention will be described in detail.

Electrostatic Powder Coating Method

An electrostatic powder coating method according to this exemplary embodiment, includes a step (hereinafter, referred to as an "attachment step") of spraying a charged powder coating material including powder particles which contain a thermosetting resin and a thermosetting agent and an external additive which includes oxide particles (hereinafter, also referred to as "TA oxide particles") containing at least one of titania and alumina, and electrostatically attaching the powder coating material to an object to be coated, and a step (hereinafter, referred to as a "baking step") of heating the powder coating material which is electrostatically attached to the object to be coated, and forming a coating film.

Then, a content Ac of the TA oxide particles (hereinafter, also referred to as "attached TA oxide particles") in the powder coating material which is electrostatically attached to the object to be coated (hereinafter, also referred to as an "attached powder coating material") and a content Ao of the TA oxide particles (hereinafter, also referred to as "TA oxide particles before being sprayed") in the powder coating material before being sprayed (hereinafter, also referred to as a "powder coating material before being sprayed") satisfy a relationship of Expression: $Ao \times 0.80 \leq Ac \leq Ao \times 1.20$.

Furthermore, the powder coating material may be either a transparent powder coating material (a clear coating material) which does not contain a colorant in powder particles or a colored powder coating material which contains a colorant in powder particles.

In the electrostatic powder coating method according to this exemplary embodiment, a variation in smoothness of the coating film which occurs at the time of reusing the powder coating material collected without being electrostatically attached to the object to be coated is prevented by the method described above. The reason is assumed as follows.

In the related art, in an electrostatic powder coating method, for example, a powder coating material is sprayed by using an electrostatic powder coating machine or the like, such as a corona gun, a tribo gun, and a bell gun. Then, in the sprayed powder coating material, the powder coating material which has not been electrostatically attached to an object to be coated is collected and is reused. In the reusing, there are a case where the collected powder coating material is independently reused and a case where the collected powder coating material is reused by being mixed with a (unused) powder coating material before being sprayed.

However, smoothness of a coating film is affected not only by melting properties or the like of a thermosetting resin contained in the powder particles of the powder coating material, but also by the content of the external additive (the TA oxide particles) of the powder coating material which is electrostatically attached to the object to be coated. That is, according to the content of the external additive (the TA oxide particles), the melting properties of the powder particles are changed, and the smoothness of the coating film also varies. For this reason, in the case where the content of the external additive (hereinafter, also referred to as a "collected external additive") in the powder coating material (hereinafter, also referred to as a "collected powder coating material") which is collected without being electrostatically attached to the object to be coated is remarkably different from the content of the external additive in the (unused) powder coating material before being sprayed, a variation in the smoothness of the coating film occurs at the time of performing electrostatic powder coating by reusing the powder coating material which is collected without being electrostatically attached to the object to be coated. In particular, as the external additive, the TA oxide particles containing at least one of titania and alumina affect fluidity and charging properties of the powder coating material, and in the case where the content of the TA oxide particles is different, a difference occurs in an attachment state with respect to the object to be coated at the time of electrostatically attaching the powder coating material to the object to be coated, and thus, an influence on the smoothness of the coating film tends to increase. Accordingly, a variation in the smoothness of the coating film also tends to increase.

Therefore, the content Ac of the attached TA oxide particles and the content Ao of the TA oxide particles before being sprayed are set to satisfy a relationship of Expression: $Ao \times 0.80 \leq Ac \leq Ao \times 1.20$. Satisfying the relationship indicates that there is no or a small change between the content Ac of the attached TA oxide particles and the content Ao of the TA oxide particles before being sprayed. That is, satisfying the relationship indicates that the powder coating material is electrostatically attached to the object to be coated in a state of being close to the content Ao of the TA oxide particles before being sprayed. Then, in the case where powder coating material is electrostatically attached to the object to be coated in a state of being close to the content Ao of the TA oxide particles before being sprayed, there is no change or a small change between the content of the collected TA oxide particles in the collected powder coating material which has not been electrostatically attached to the object to be coated and the content Ao of the oxide before being sprayed. Accordingly, a difference in the melting properties between the total powder coating material before being sprayed and the total collected powder coating material, which are electrostatically attached, rarely occurs.

For this reason, even when the electrostatic powder coating is performed by reusing the collected powder coating material, a change in the melting properties of the powder particles in the powder coating material which is electrostatically attached to the object to be coated is prevented.

In addition, the content Ac of the attached TA oxide particles and the content Ao of the TA oxide particles before being sprayed satisfying the relationship described above indicates that there is no or a small difference in the fluidity and the charging properties between the total powder coating material before being sprayed and the total collected powder coating material. Accordingly, a difference in the attachment state with respect to the object to be coated between the total powder coating material before being sprayed and the total collected powder coating material, which are electrostatically attached, rarely occurs.

From the reason described above, it is assumed that a variation in the smoothness of the coating film which occurs at the time of reusing the powder coating material collected without being electrostatically attached to the object to be coated is prevented in the electrostatic powder coating method according to this exemplary embodiment.

In the electrostatic powder coating method according to this exemplary embodiment, the content Ac of the attached TA oxide particles and the content Ao of the TA oxide particles before being sprayed satisfy a relationship of Expression: $Ao \times 0.80 \leq Ac \leq Ao \times 1.20$, and preferably satisfy a relationship of Expression: $Ao \times 0.90 \leq Ac \leq Ao \times 1.10$ from the viewpoint of preventing a variation in the smoothness of the coating film.

Here, in order to set the content Ac of the attached TA oxide particles and the content Ao of the TA oxide particles before being sprayed to satisfy the relationship of the expression described above, for example, improvement of the fluidity and uniformization the charging properties of the powder coating material before being sprayed (the powder particles before being sprayed) (that is, narrowing of a charge distribution of the powder coating material before being sprayed (the powder particles before being sprayed)) by are obtained by 1) reducing the diameter of the powder particles of the powder coating material before being sprayed (for example, setting the volume average particle diameter of the powder particles of the powder coating material before being sprayed to be from 3 μm to 10 μm), 2) forming the powder particles of the powder coating material before being sprayed into the shape of a sphere (for example, setting an average circularity of the powder particles of the powder coating material before being sprayed to be greater than or equal to 0.96), 3) narrowing a particle diameter distribution of the powder particles of the powder coating material before being sprayed (for example, setting a volume particle diameter distribution index GSDv of the powder particles of the powder coating material before being sprayed to be less than or equal to 1.50), 4) adding an external additive other than the TA oxide particles containing at least one of titania and alumina to the powder coating material before being sprayed (for example, adding silica particles to the powder coating material), and 5) combining the methods described above, or the like.

In particular, silica particles may preferably be contained in the powder coating material as the external additive, along with the TA oxide particles containing at least one of titania and alumina. In the case where the silica particles are externally added, the fluidity of the powder coating material is easily remarkably improved, but a variation in the charging properties of the powder coating material tends to increase. In the case where the TA oxide particles which prevent a variation in the charging properties of the powder coating material are externally added along with the silica particles having such properties, the fluidity and the charging properties of the powder coating material are easily uniformized. As a result thereof, the content Ac of the attached TA oxide particles and the content Ao of the TA oxide particles before being sprayed satisfy the relationship of the expression described above, and a variation in the smoothness of the coating film is easily prevented.

In addition, in the case where the powder particles having a narrowed particle diameter distribution, a small diameter, and a spherical shape are applied, the attachment state of the TA oxide particles with respect to the surface of the powder particles increasingly tends to be close to uniform, a difference in the melting properties between the total powder coating material before being sprayed and the total collected powder coating material, which are electrostatically attached, rarely occurs, and a variation in the smoothness of the coating film is easily prevented.

In addition, in the case where the powder particles before being sprayed contain a white pigment (in particular, titanium oxide particles), the charging properties of the powder coating material to be sprayed (the powder particles before being sprayed) are affected by dispersibility of the white pigment. That is, in the case where the dispersibility of the white pigment in the powder particles before being sprayed is low, the charging properties of the powder coating material to be sprayed (the powder particles before being sprayed) tend to decrease (that is, the charge distribution of the powder coating material before being sprayed (the powder particles before being sprayed) widens). For this reason, increasing the dispersibility of the white pigment by containing the white pigment (in particular, the titanium oxide particles) in the powder particles before being sprayed in a state where the diameter of the particles is reduced close to uniform is preferable since the content Ac of the attached TA oxide particles and the content Ao of the TA oxide particles before being sprayed easily satisfy the relationship of the expression described above. That is, setting the content Ac of the attached TA oxide particles and the content Ao of the TA oxide particles before being sprayed to satisfy the relationship of the expression described above indicates that the white pigment (in particular, the titanium oxide particles) is contained in the powder particles before being sprayed in a state where the diameter of the particles is reduced close to uniform.

Hereinafter, the details of the electrostatic powder coating method according to this exemplary embodiment will be described.

Attachment Step

In the attachment step, in the powder coating material (the powder coating material before being sprayed) including the powder particles (the powder particles before being sprayed) which contain the thermosetting resin and the thermosetting agent, the charged powder coating material is sprayed, and the powder coating material is electrostatically attached to the object to be coated.

Specifically, in the attachment step, for example, the charged powder coating material is sprayed from the spray port of the electrostatic powder coating machine in a state where an electrostatic field is formed between a spray port of a electrostatic powder coating machine and a surface to be coated of the object to be coated (a surface having conductivity), and the powder coating material is electrostatically attached to a surface to be coated of the object, and thus, a film of the powder coating material is formed. That is, for example, a voltage is applied by setting the surface of the object which is grounded to a positive electrode and the electrostatic powder coating machine to a negative electrode, the electrostatic field is formed in both of the electrodes, and the charged powder coating material is electrostatically attached to the surface of the object by being flown, and thus, the film of the powder coating material is formed.

Furthermore, the attachment step may be performed while relatively moving the spray port of the electrostatic powder coating machine and the surface to be coated of the object.

Here, for example, a known electrostatic powder coating machine such as a corona gun (a coating machine which sprays a charged powder coating material in corona discharge), a tribo gun (a coating machine which sprays a powder coating material in friction charge), and a bell gun (a coating machine which centrifugally sprays a charged powder coating material in corona discharge or friction charge) is able to be used as the electrostatic powder coating machine. Then, spray conditions for excellent coating may be a setting range of each of the guns.

The attachment amount of the powder coating material to be attached to the surface to be coated of the object to be coated may preferably be from 1.5 $g/m^2$ to 15.0 $g/m^2$ (preferably, from 2.5 $g/m^2$ to 10.0 $g/m^2$) from the viewpoint of setting the content Ac of the attached TA oxide particles and the content Ao of the TA oxide particles before being sprayed to satisfy the relationship of the expression described above and preventing a variation in the smoothness of the coating film.

Baking Step

In the baking step, the powder coating material which is electrostatically attached to the object to be coated is heated, and thus, the coating film is formed. Specifically, the powder particles of the film of the powder coating material are melted and cured by heating, and thus, the coating film is formed.

A heating temperature (a baking temperature) is selected according to the type of powder coating material. As an example, the heating temperature (the baking temperature) is preferably from 90° C. to 250° C., is more preferably from 100° C. to 220° C., and is even more preferably from 120° C. to 200° C. Furthermore, a heating time (a baking time) is adjusted according to the heating temperature (the baking temperature).

Formation of the coating film, that is, coating of the object to be coated is performed, through the steps described above. Furthermore, the attachment and the heating (the baking) of the powder coating material may be simultaneously performed.

Here, the object to be coated which is a target product to be coated with the powder coating material is not particularly limited, and examples of the object to be coated include various metal components, ceramic components, resin components, and the like. The target product may be an unmolded product before being molded into each product such as a plate-shaped product and a linear product, or may be a molded product molded for electronic components, road vehicles, interior and exterior architectural materials, and the like. In addition, the target product may be a product whose surface to be coated is subjected to a surface treatment such as a primer treatment, a plating treatment, and electrodeposition coating, in advance.

Powder Coating Material

The powder coating material according to this exemplary embodiment includes the powder particles which contain the thermosetting resin and the thermosetting agent and the external additive which includes the oxide particles (the TA oxide particles) containing at least one of titania and alumina, and when the powder coating material is sprayed and the powder coating material is electrostatically attached to the object to be coated, the content Ac of the oxide particles in the powder coating material which is electrostatically attached to the object to be coated and the content Ao of the oxide particles in the powder coating material before being sprayed satisfy a relationship of Expression: $Ao \times 0.80 \leq Ac \leq Ao \times 1.20$ (preferably, a relationship of Expression: $Ao \times 0.90 \leq Ac \leq Ao \times 1.10$).

The powder coating material according to this exemplary embodiment prevents a variation in the smoothness of the coating film as described in the electrostatic powder coating method according to this exemplary embodiment.

Furthermore, in the powder coating material according to this exemplary embodiment, satisfying the relationship of the expression described above indicates that when the powder coating material is sprayed and the powder coating material is electrostatically attached to the object to be coated, by using the conditions of the electrostatic powder coating method which will be described in the section of "Electrostatic Powder Coating" in the following example as conditions of spraying the powder coating material and electrostatically attaching the powder coating material to the object to be coated, the content Ac of the oxide particles in the powder coating material which is electrostatically attached to the object to be coated and the content Ao of the oxide particles in the powder coating material before being sprayed satisfy the expression described above.

Hereinafter, the details of the powder coating material used in the electrostatic powder coating method according to this exemplary embodiment (the powder coating material before being sprayed) and the powder coating material according to this exemplary embodiment will be collectively described. Furthermore, hereinafter, both of the powder coating materials will be described by being referred to as the powder coating material according to this exemplary embodiment.

The powder coating material according to this exemplary embodiment includes the powder particles and an external additive.

Powder Particles

The powder particles contain the thermosetting resin and the thermosetting agent. The powder particles may contain a colorant, and other additives, if necessary.

Thermosetting Resin

The thermosetting resin is a resin including a thermosetting reaction group. In the related art, as the thermosetting resin, various types of resin used in the powder particles of the powder coating material are used.

The thermosetting resin may preferably be a water-insoluble (hydrophobic) resin. When the water-insoluble (hydrophobic) resin is used as the thermosetting resin, environmental dependence of a charging property of the powder coating material (powder particle) is decreased. When preparing the powder particle by an aggregation and coalescence method, the thermosetting resin is preferably a water-insoluble (hydrophobic) resin, in order to perform emulsification and dispersion in an aqueous medium. The water-insolubility (hydrophobicity) means a dissolved amount of a target material with respect to 100 parts by weight of water at 25° C. is less than 5 parts by weight.

Examples of the thermosetting resin include at least one selected from the group consisting of a thermosetting (meth)acrylic resin and a thermosetting polyester resin. Among the thermosetting resins, the thermosetting polyester resin is preferable from the viewpoint of easy control of charging series at the time of performing coating, strength of the coating film, excellent finishing properties, and the like.

Examples of the thermosetting reaction group included in the thermosetting polyester resin include an epoxy group, a carboxyl group, a hydroxyl group, an amide group, an amino group, an acid anhydride group, a block isocyanate group, and the like, and the carboxyl group and the hydroxyl group are preferable from the viewpoint of easy synthesis.

Thermosetting Polyester Resin

The thermosetting polyester resin is a polyester resin having a curable reaction group. Examples of a thermosetting reaction group included in the thermosetting polyester resin include an epoxy group, a carboxyl group, a hydroxyl group, an amide group, an amino group, an acid anhydride group, a block isocyanate group, and the like, and the carboxyl group and the hydroxyl group are preferable from the viewpoint of easy synthesis.

The thermosetting polyester resin, for example, is a polycondensate obtained by performing at least polycondensation with respect to a polybasic acid and polyol.

The thermosetting reaction group of the thermosetting polyester resin is introduced by adjusting the use amount of the polybasic acid and the polyol at the time of synthesizing the polyester resin. According to the adjustment, a thermosetting polyester resin having at least one of a carboxyl group and a hydroxyl group is able to be obtained as the thermosetting reaction group.

In addition, the thermosetting polyester resin may be obtained by introducing the thermosetting reaction group after the polyester resin is synthesized.

Examples of polybasic acid include terephthalic acid, isophthalic acid, phthalic acid, methylterephthalic acid, trimellitic acid, pyromellitic acid, or anhydrides thereof; succinic acid, adipic acid, azelaic acid, sebacic acid, or anhydrides thereof; maleic acid, itaconic acid, or anhydrides thereof; fumaric acid, tetrahydrophthalic acid, methyltetrahydrophthalic acid hexahydrophthalic acid, methylhexahydrophthalic acid, or anhydrides thereof; cyclohexane dicarboxylic acid, 2,6-naphthalene dicarboxylic acid, and the like.

Examples of polyol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-hydroxyethyl terephthalate, cyclohexanedimethanol, octanediol, diethylpropane diol, butylethylpropane diol, 2-methyl-1,3-propane diol, 2,2,4-trimethylpentane diol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, tris-hydroxyethyl isocyanurate, hydroxy pivalyl hydroxy pivalate, and the like.

The thermosetting polyester resin may be obtained by polycondensing other monomer in addition to polybasic acid and polyol.

Examples of the other monomer include a compound including both a carboxylic group and a hydroxyl group in one molecule (for example, dimethanol propionic acid and hydroxy pivalate), a monoepoxy compound (for example, glycidyl ester of branched aliphatic carboxylic acid such as "CARDURA E10 (manufactured by Shell)"), various monohydric alcohols (for example, methanol, propanol, butanol, and benzyl alcohol), various monobasic acids (for example, benzoic acid and p-tert-butyl benzoate), various fatty acids (for example, castor oil fatty acid, coconut oil fatty acid, and soybean oil fatty acid), and the like.

The structure of the thermosetting polyester resin may be a branched structure or a linear structure.

Regarding the thermosetting polyester resin, the total of an acid value and a hydroxyl value is preferably from 10 mgKOH/g to 250 mgKOH/g, and the number average molecular weight is preferably from 1,000 to 100,000.

When the total of an acid value and a hydroxyl value is in the range described above, smoothness and a mechanical property of the coating film are easily improved. When the number average molecular weight is in the range described above, smoothness and a mechanical property of the coating film are improved and storage stability of the powder coating material is easily improved.

The measurement of the acid value and the hydroxyl value of the thermosetting polyester resin is performed based on JIS K-0070-1992. In addition, the measurement of the number average molecular weight of the thermosetting polyester resin is performed in the same manner as measurement of the number average molecular weight of the thermosetting (meth)acrylic resin.

Thermosetting (Meth)Acrylic Resin

The thermosetting (meth)acrylic resin is a (meth)acrylic resin including a thermosetting reaction group. For the introduction of the thermosetting reaction group to the thermosetting (meth)acrylic resin, a vinyl monomer including a thermosetting reaction group may preferably be used. The vinyl monomer including a thermosetting reaction group may be a (meth)acrylic monomer (monomer having a (meth)acryloyl group), or may be a vinyl monomer other than the (meth)acrylic monomer.

Examples of the thermosetting reaction group of the thermosetting (meth)acrylic resin include an epoxy group, a carboxylic group, a hydroxyl group, an amide group, an amino group, an acid anhydride group, a (block) isocyanate group, and the like. Among these, as the thermosetting reaction group of the (meth)acrylic resin, at least one kind selected from the group consisting of an epoxy group, a carboxylic group, and a hydroxyl group is preferable, from the viewpoint of ease of preparation of the (meth)acrylic resin. Particularly, from the viewpoints of excellent storage stability of the powder coating material and coating film appearance, at least one kind of the thermosetting reaction group is more preferably an epoxy group.

Examples of the vinyl monomer including an epoxy group as the thermosetting reaction group include various chain epoxy group-containing monomers (for example, glycidyl (meth)acrylate, β-methyl glycidyl (meth)acrylate, glycidyl vinyl ether, and allyl glycidyl ether), various (2-oxo-1,3-oxolane) group-containing vinyl monomers (for example, (2-oxo-1,3-oxolane) methyl (meth)acrylate), various alicyclic epoxy group-containing vinyl monomers (for example, 3,4-epoxy cyclohexyl (meth)acrylate, 3,4-epoxycyclohexylmethyl (meth)acrylate, and 3,4-epoxycyclohexylethyl (meth)acrylate), and the like.

Examples of the vinyl monomer including a carboxylic group as the thermosetting reaction group include various carboxylic group-containing monomers (for example, (meth)acrylic acid, crotonic acid, itaconic acid, maleic acid, and fumaric acid), various monoesters of $\alpha,\beta$-unsaturated dicarboxylic acid and monohydric alcohol having 1 to 18 carbon atoms (for example, monomethyl fumarate, monoethyl fumarate, monobutyl fumarate, monoisobutyl fumarate, monotert-butyl fumarate, monohexyl fumarate, monooctyl fumarate, mono 2-ethylhexyl fumarate, monomethyl maleate, monoethyl maleate, monobutyl maleate, monoisobutyl maleate, monotert-butyl maleate, monohexyl maleate, monooctyl maleate, and mono 2-ethylhexyl maleate), monoalkyl ester itaconate (for example, monomethyl itaconate, monoethyl itaconate, monobutyl itaconate, monoisobutyl itaconate, monohexyl itaconate, monooctyl itaconate, and mono 2-ethylhexyl itaconate), and the like.

Examples of the vinyl monomer including a hydroxyl group as the thermosetting reaction group include various hydroxyl group-containing (meth)acrylates (for example, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), an addition reaction product of the various hydroxyl group-containing (meth)acrylates and ε-caprolactone, various hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the various hydroxyl group-containing vinyl ethers and ε-caprolactone, various hydroxyl group-containing allyl ethers (for example, 2-hydroxyethyl (meth)allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), an addition reaction product of the various hydroxyl group-containing allyl ethers and ε-caprolactone, and the like.

In the thermosetting (meth)acrylic resin, another vinyl monomer not including a thermosetting reaction group may be copolymerized, in addition to the (meth)acrylic monomer.

Examples of the other vinyl monomer include various α-olefins (for example, ethylene, propylene, and butene-1), various halogenated olefins except fluoroolefin (for example, vinyl chloride and vinylidene chloride), various aromatic vinyl monomers (for example, styrene, α-methyl styrene, and vinyl toluene), various diesters of unsaturated dicarboxylic acid and monohydric alcohol having 1 to 18 carbon atoms (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (for example, maleic anhydride, itaconic anhydride, citraconic anhydride, (meth)acrylic anhydride, and tetrahydrophthalic anhydride), various phosphoric acid ester group-containing monomers (for example, diethyl-2-(meth) acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (for example, γ-(meth)acryloyloxypropyl trimethoxysilane, γ-(meth)acryloyloxypropyl triethoxysilane, and γ-(meth) acryloyloxypropyl methyldimethoxysilane), various vinyl aliphatic carboxylate (for example, vinyl acetate, vinyl propionate, vinyl butyrate, vinyl isobutyrate, vinyl caproate, vinyl caprylate, vinyl caprate, vinyl laurate, branched vinyl aliphatic carboxylate having 9 to 11 carbon atoms, and vinyl stearate), various vinyl ester of carboxylic acid having a cyclic structure (for example, cyclohexane carboxylic acid vinyl, methylcyclohexane carboxylic acid vinyl, vinyl benzoate, and p-tert-butyl vinyl benzoate), and the like.

In the thermosetting (meth)acrylic resin, in the case of using a vinyl monomer other than the (meth)acrylic monomer, as the vinyl monomer including a thermosetting reaction group, an acrylic monomer not including a thermosetting reaction group is used.

Examples of the acrylic monomer not including a thermosetting reaction group include alkyl ester (meth)acrylate (for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, and stearyl (meth)acrylate), various aryl ester (meth) acrylates (for example, benzyl (meth)acrylate, phenyl (meth)acrylate, and phenoxyethyl (meth)acrylate), various alkyl carbitol (meth)acrylates (for example, ethyl carbitol (meth)acrylate), other various ester (meth)acrylates (for example, isobornyl (meth)acrylate, dicyclopentanyl (meth) acrylate, dicyclopentenyl (meth)acrylate, dicyclopentenyloxyethyl (meth)acrylate, and tetrahydrofurfuryl (meth) acrylate), various amino group-containing amide unsaturated monomers (for example, N-dimethylaminoethyl (meth)acrylamide, N-diethylaminoethyl (meth)acrylamide, N-dimethylaminopropyl (meth)acrylamide, and N-diethylamino propyl (meth)acrylamide), various dialkylaminoalkyl (meth)acrylates (for example, dimethylaminoethyl (meth) acrylate and diethylaminoethyl (meth)acrylate), various amino group-containing monomers (for example, tert-butylaminoethyl (meth)acrylate, tert-butylaminopropyl (meth) acrylate, aziridinylethyl (meth)acrylate, pyrrolidinylethyl (meth)acrylate, and piperidinylethyl (meth)acrylate), and the like.

The thermosetting (meth)acrylic resin is preferably an acrylic resin having a number average molecular weight of from 1,000 to 20,000 (more preferably from 1,500 to 15,000).

When the number average molecular weight thereof is in the range described above, smoothness and mechanical properties of the coating film are easily improved.

The number average molecular weight of the thermosetting (meth)acrylic resin is measured by gel permeation chromatography (GPC). The molecular weight measurement by GPC is performed with a THF solvent using HLC-8120 GPC, which is GPC manufactured by Tosoh Corporation as a measurement device and TSKGEL SUPER HM-M (15 cm), which is a column manufactured by Tosoh Corporation. The weight average molecular weight and the number average molecular weight are calculated using a calibration curve of molecular weight created with a monodisperse polystyrene standard sample from results of this measurement.

The thermosetting resin may be used alone or in combination of two or more kinds thereof.

The content of the thermosetting resin is preferably from 20% by weight to 99% by weight, and is more preferably from 30% by weight to 95% by weight, with respect to the total content of the powder particles.

Furthermore, as described below, in the case where the powder particles are core-shell particles, when the thermosetting resin is applied as a resin of a resin coating portion, the content of the thermosetting resin described above indicates the content of the total thermosetting resin of a core and the resin coating portion.

Thermosetting Agent

The thermosetting agent is selected according to the type of thermosetting reaction group of the thermosetting resin.

Here, the thermosetting agent indicates a compound having a functional group which is able to react with the thermosetting reaction group which is a terminal group of the thermosetting resin.

When the thermosetting reaction group of the thermosetting resin is a carboxyl group, examples of the thermosetting agent include various epoxy resins (for example, polyglycidyl ether of bisphenol A), an epoxy group-containing acrylic resin (for example, glycidyl group-containing acrylic resin), various polyglycidylethers of polyol (for example, 1,6-hexanediol, trimethylol propane, and trimethylol ethane), various polyglycidyl esters of polycarboxylic acid (for example, phthalic acid, terephthalic acid, isophthalic acid, hexahydrophthalic acid, methyl hexahydrophthalic acid, trimellitic acid, and pyromellitic acid), various alicyclic epoxy group-containing compounds (for example, bis(3,4-epoxy cyclohexyl) methyl adipate), hydroxy amide (for example, triglycidyl isocyanurate and β-hydroxyalkyl amide), and the like.

When the thermosetting reaction group of the thermosetting resin is a hydroxyl group, examples of the thermosetting agent include blocked polyisocyanate, aminoplast, and the like. Examples of blocked polyisocyanate include organic diisocyanate such as various aliphatic diisocyanates (for example, hexamethylene diisocyanate and trimethyl hexamethylene diisocyanate), various alicyclic diisocyanates (for example, xylylene diisocyanate and isophorone diisocyanate), various aromatic diisocyanates (for example, tolylene diisocyanate and 4,4'-diphenylmethane diisocyanate); an adduct of the organic diisocyanate and polyol, a low-molecular weight polyester resin (for example, polyester polyol), or water; a polymer of the organic diisocyanate (a polymer including isocyanurate-type polyisocyanate compound); various polyisocyanate compounds blocked by a commonly used blocking agent such as isocyanate biuret product; a self-block polyisocyanate compound having a uretdione bond in a structural unit; and the like.

When the thermosetting reaction group of the thermosetting resin is an epoxy group, specific examples of the thermosetting agent include acid such as succinic acid, glutaric acid, adipic acid, pimelic acid, suberic acid, azelaic acid, sebacic acid, dodecanedioic acid, eicosanoic diacid, maleic acid, citraconic acid, itaconic acid, glutaconic acid, phthalic acid, trimellitic acid, pyromellitic acid, tetrahydrophthalic acid, hexahydrophthalic acid, and cyclohexene-1,2-dicarboxylic acid; anhydrides thereof; urethane-modified products thereof; and the like. Among these, as the thermosetting agent, aliphatic dibasic acid is preferably from the viewpoints of a property of the coating film and storage stability, and dodecanedioic acid is particularly preferable from the viewpoint of a property of the coating film.

The thermosetting agent may be used alone or in combination of two or more kinds thereof.

The content of the thermosetting agent is preferably from 1% by weight to 30% by weight and more preferably from 3% by weight to 20% by weight, with respect to the thermosetting resin.

In the case where the powder particle is a particle having a core/shell structure, when the thermosetting resin is used as the resin of the resin coating portion, the content of the thermosetting agent means the content with respect to the entire thermosetting resin in the core and the resin coating portion.

Colorant

As a colorant, a pigment is used, for example. As the colorant, a pigment and a dye may be used in combination.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolone yellow; and the like.

In addition, as the pigment, a brilliant pigment is also used. Examples of the brilliant pigment include metal powder such as a pearl pigment, aluminum powder, stainless steel powder; metallic flakes; glass beads; glass flakes; mica; and flake-shaped iron oxide (MIO).

The colorant may be used alone or in combination of two or more kinds thereof.

The content of the colorant is determined depending on types of the pigment, and the hue, brightness, and the depth required for the coating film.

The content of the colorant is, for example, preferably from 1% by weight to 70% by weight and more preferably from 2% by weight to 60% by weight, with respect to the entire resin which constitutes the powder particle.

Here, the powder particles may contain coloring pigments other than the white pigment as the colorant, along with the white pigment. The powder particles contain the coloring pigment and the white pigment, and thus, the color of the surface of the object to be coated is concealed by the coating film, and color developing properties of the coloring pigment are improved. Furthermore, examples of the white pigment include a known white pigment such as titanium oxide, barium sulphate, zinc oxide, and calcium carbonate, and the titanium oxide is preferable from the viewpoint of high whiteness (that is, high concealing properties).

Metal Ion Having Valence of Two or More

The powder particles may preferably contain a metal ion having a valence of two or more (hereinafter, also simply referred to as "metal ion"). When the powder particles are the core-shell particles as described below, the metal ion may be a component contained in both of the core and the resin coating portion of the powder particles, or either thereof.

When the bivalent or higher valent metal ion is contained in the powder particles, ion-crosslinking is formed due to the metal ion in the powder particles. For example, the ion-crosslinking is formed due to a mutual interaction between the functional group (for example, when the thermosetting polyester resin is used as the thermosetting resin, the carboxyl group or the hydroxyl group of the thermosetting polyester resin) of the thermosetting resin and the metal ion. According to the ion-crosslinking, a phenomenon (so-called bleeding) in which encapsulated substances of the powder particles (the thermosetting agent, and a colorant to be added if necessary, and other additives, in addition to the thermosetting agent) are precipitated on the surface of the powder particles is prevented, and thus, storing properties easily become higher. In addition, in the ion-crosslinking, the bonding of the ion-crosslinking is broken by heating at the time of thermosetting the powder coating material after being coated, and thus, melt viscosity of the powder particles is low, and a coating film having high smoothness is easily formed.

Examples of the metal ion include a metal ion having a valence of from 2 to 4 (bivalent to tetravalent). Specifically, examples of the metal ion include at least one type of metal ion selected from the group consisting of aluminum ion, magnesium ion, iron ion, zinc ion, and calcium ion.

Examples of a supply source of the metal ion (a compound contained in the powder particles as an additive) include a metal salt, an inorganic metal salt polymer, a metal complex, and the like. When the powder particles are prepared by an aggregation and coalescence method, the metal salt and the inorganic metal salt polymer, for example, are added to the powder particles as a coagulant.

Examples of the metal salt include aluminum sulfate, aluminum chloride, magnesium chloride, magnesium sulfate, iron chloride (II), zinc chloride, calcium chloride, calcium sulfate, and the like.

Examples of the inorganic metal salt polymer include polyaluminum chloride, polyaluminum hydroxide, polyiron sulfate (II), calcium polysulfide, and the like.

Examples of the metal complex include a metal salt of an aminocarboxylic acid, and the like. Specifically, examples of the metal complex include a metal salt (for example, a calcium salt, a magnesium salt, an iron salt, an aluminum salt, and the like) containing a known chelate such as an ethylene diamine tetraacetic acid, a propane diamine tetraacetic acid, a nitrile triacetic acid, a triethylene tetramine hexaacetic acid, and a diethylene triamine pentaacetic acid as a base, and the like.

Furthermore, the supply source of the metal ion may be added not as the coagulant but as a mere additive.

It is preferable that the valence of the metal ion becomes higher from the viewpoint of easily forming mesh-shaped ion-crosslinking, the smoothness and the storing properties of the powder coating material. For this reason, Al ion is preferable as the metal ion. That is, an aluminum salt (for example, aluminum sulfate, aluminum chloride, and the like) and an aluminum salt polymer (for example, polyaluminum chloride, polyaluminum hydroxide, and the like) are preferable as the supply source of the metal ion. Further, among the supply sources of the metal ion, an inorganic metal salt polymer is preferable from the viewpoint of the smoothness and the storing properties of the powder coating material, compared to the metal salt even at the time of having the same valence of the metal ion. For this reason, the aluminum salt polymer (for example, the polyaluminum chloride, the polyaluminum hydroxide, and the like) is particularly preferable as the supply source of the metal ion.

The content of the metal ion is preferably from 0.002% by weight to 0.2% by weight, and is more preferably from 0.005% by weight to 0.15% by weight, with respect to the total content of the powder particles, from the viewpoint of the smoothness and the storing properties of the powder coating material.

When the content of the metal ion is greater than or equal to 0.002% by weight, suitable ion-crosslinking is formed by the metal ion, so that the bleeding of the powder particles is prevented, the storing properties of the coating material easily become higher. On the other hand, when the content of the metal ion is less than or equal to 0.2% by weight, the ion-crosslinking is prevented from being excessively formed by the metal ion, and the smoothness of the coating film easily becomes higher.

Here, when the powder particles are prepared by the aggregation and coalescence method, the supply source of the metal ion (a metal salt and a metal salt polymer) added as the coagulant contributes to control of the particle diameter distribution and the shape of the powder particles.

Specifically, it is preferable that the valence of the metal ion becomes higher from the viewpoint of obtaining a narrow particle diameter distribution. In addition, the metal salt polymer is preferable from the viewpoint of obtaining a narrow particle diameter distribution, compared to the metal salt even at the time of having the same valence of the metal ion. For this reason, from this viewpoint, the aluminum salt (for example, aluminum sulfate, aluminum chloride, and the like) and the aluminum salt polymer (for example, polyaluminum chloride, polyaluminum hydroxide, and the like) are preferable, and the aluminum salt polymer (for example, the polyaluminum chloride, the polyaluminum hydroxide, and the like) is particularly preferable, as the supply source of the metal ion.

In addition, when the coagulant is added such that the content of the metal ion is greater than or equal to 0.002% by weight, aggregation of the resin particles progresses in an aqueous medium, and thus, contributes to realization of a narrow particle diameter distribution. In addition, aggregation of the resin particles which become the resin coating portion progresses with respect to aggregated particles which become the core, and thus, contributes to realization of formation of the coating portion with respect to the entire surface of the core. On the other hand, when the coagulant is added such that the content of the metal ion is less than or equal to 0.2% by weight, the ion-crosslinking is prevented from being excessively formed in the aggregated particles, and the shape of the powder particles to be formed is easily close to a spherical shape at the time of performing aggregation and coalescence. For this reason, from the viewpoint, the content of the metal ion is preferably from 0.002% by weight to 0.2% by weight, and is more preferably from 0.005% by weight to 0.15% by weight.

The content of the metal ion is measured by performing quantitative analysis with respect to intensity of a fluorescent X ray of the powder particles. Specifically, for example, first, the resin and the supply source of the metal ion are mixed, and thus, a resin mixture in which the concentration of the metal ion is already known. A pellet sample is obtained from 200 mg of the resin mixture by using a tablet molding machine having a diameter of 13 mm. The weight of the pellet sample is weighed, intensity of a fluorescent X ray of the pellet sample is measured, and thus, peak intensity is obtained. Similarly, a pellet sample in which the added amount of the supply source of the metal ion is changed is also subjected to measurement, and a calibration curve is prepared from the result thereof. Then, the content of the metal ion in the powder particles which become a measurement target is subjected to quantitative analysis by using the calibration curve.

Examples of an adjustment method of the content of the metal ion include 1) a method of adjusting the added amount of the supply source of the metal ion, 2) a method of adjusting the content of the metal ion by adding the coagulant (for example the metal salt or the metal salt polymer) as the supply source of the metal ion in an aggregation step at the time of preparing the powder particles by the aggregation and coalescence method, and then by adding a chelating agent (for example, an ethylene diamine tetraacetic acid (EDTA), a diethylene triamine pentaacetic acid (DTPA), a nitrilotriacetic acid (NTA), and the like) in the final stage of the aggregation step, by forming a complex with the metal ion by the chelating agent, and by removing a complex salt which is formed in the subsequent washing step or the like, and the like.

Other Additive

As the other additive, various additives used in the powder coating material are used.

Specific examples of the other additive include a foam inhibitor (for example, benzoin or benzoin derivatives), a hardening accelerator (an amine compound, an imidazole compound, or a cationic polymerization catalyst), a surface adjusting agent (a leveling agent), a plasticizer, a charge-controlling agent, an antioxidant, a pigment dispersant, a flame retardant, a fluidity-imparting agent, and the like.

Core-Shell Particles

In this exemplary embodiment, the powder particles may be the core-shell particles including the core which contains the thermosetting resin and the thermosetting agent, and the resin coating portion which covers the surface of the core.

At this time, the core may contain the additives other than the colorant described above, if necessary, in addition to the thermosetting resin and the thermosetting agent.

In addition, the resin coating portion of the core-shell particles will be described below.

The resin coating portion may be composed only of a resin, or may contain other components (the thermosetting agent, the other additives, and the like which are described as the components constituting the core).

Here, it is preferable that the resin coating portion is composed only of the resin from the viewpoint of reducing the bleeding. Furthermore, even when the resin coating portion contains other components in addition to the resin, the content of the resin may be greater than or equal to 90% by weight (preferably, greater than or equal to 95% by weight) with respect to the total resin coating portion.

The resin constituting the resin coating portion may be a non-curable resin, or may be a thermosetting resin, and it is preferable that the resin is the thermosetting resin from the viewpoint of improving curing density (crosslinking density) of the coating film.

When the thermosetting resin is applied as the resin of the resin coating portion, examples of the thermosetting resin include the same thermosetting resins as those of the core, and preferable examples thereof are identical to those of the thermosetting resin of the core. Here, the thermosetting resin of the resin coating portion may be a resin identical to the thermosetting resin of the core, or may be a resin different from the thermosetting resin of the core.

Furthermore, when the non-curable resin is applied as the resin of the resin coating portion, examples of the non-curable resin preferably include at least one selected from the group consisting of an acrylic resin and a polyester resin.

A coverage of the resin coating portion is preferably from 30% to 100% and more preferably from 50% to 100%, in order to prevent bleeding.

The coverage of the resin coating portion with respect to the surface of the powder particle is a value determined by X-ray photoelectron spectroscopy (XPS) measurement.

Specifically, in the XPS measurement, JPS-9000MX manufactured by JEOL Ltd. is used as a measurement device, and the measurement is performed using a MgKα ray as the X-ray source and setting an accelerating voltage to 10 kV and an emission current to 30 mA.

The coverage of the resin coating portion with respect to the surface of the powder particles is quantized by peak separation of a component derived from the material of the core and a component derived from a material of the resin coating portion on the surface of the powder particles, from the spectrum obtained under the conditions described above. In the peak separation, the measured spectrum is separated into each component using curve fitted by the least square method.

As the component spectrum to be a separation base, the spectrum obtained by singly measuring the thermosetting resin, a thermosetting agent, a pigment, an additive, a coating resin used in preparation of the powder particle is used. In addition, the coverage is determined from a ratio of a spectral intensity derived from the coating resin with respect to the total of entire spectral intensity obtained from the powder particles.

A thickness of the resin coating portion is preferably from 0.2 μm to 4 μm and more preferably from 0.3 μm to 3 μm, in order to prevent bleeding.

The thickness of the resin coating portion is a value measured by the following method. The powder particle is embedded in the epoxy resin or the like, and a sliced piece is prepared by performing cutting with a diamond knife. This sliced piece is observed using a transmission electron microscope (TEM) or the like and plural images of the cross section of the powder particles are imaged. The thicknesses of 20 portions of the resin coating portion are measured from the images of the cross section of the powder particle, and an average value thereof is used. When it is difficult to observe the resin coating portion in the image of the cross section due to a clear powder coating material, it is possible to easily perform the measurement by performing dyeing and observation.

Preferable Properties of Powder Particles

Volume Particle Diameter Distribution Index GSDv

The volume particle diameter distribution index GSDv of the powder particles is preferably less than or equal to 1.50, is more preferably less than or equal to 1.40, and is even more preferably less than or equal to 1.30, from the viewpoint of the smoothness of the coating film and the storing properties of the powder coating material. In particular, it is preferable that the volume particle diameter distribution index GSDv of the powder particles (that is, the volume particle diameter distribution index GSDv of the powder particles before being sprayed) is less than or equal to 1.40, from the viewpoint of setting the content Ac of the attached TA oxide particles and the content Ao of the TA oxide particles before being sprayed to satisfy the relationship of the expression described above.

Volume Average Particle Diameter D50v

In addition, a volume average particle diameter D50v of the powder particles is preferably from 1 μm to 25 μm, is more preferably from 2 μm to 20 μm, and is even more preferably from 3 μm to 15 μm, from the viewpoint of forming a coating film having high smoothness with a small amount thereof. In particular, the volume average particle diameter D50v of the powder particles (that is, the volume average particle diameter D50v of the powder particles before being sprayed) is preferably from 3 μm to 20 μm, and is more preferably from 3 μm to 10 μm, from the viewpoint of setting the content Ac of the attached TA oxide particles and the content Ao of the TA oxide particles before being sprayed to satisfy the relationship of the expression described above.

Average Circularity

Further, the average circularity of the powder particles is preferably greater than or equal to 0.96, is more preferably greater than or equal to 0.97, and is even more preferably greater than or equal to 0.98, from the viewpoint of the smoothness of the coating film and the storing properties of the powder coating material. In particular, it is preferable that the average circularity of the powder particles (that is, the average circularity of the powder particles before being sprayed) is greater than or equal to 0.96, from the viewpoint of setting the content Ac of the attached TA oxide particles and the content Ao of the TA oxide particles before being sprayed to satisfy the relationship of the expression described above.

Herein, the volume average particle diameter D50v and the volume particle diameter distribution index GSDv of the powder particles are measured with a COULTER MULTISIZER II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkyl benzene sulfonate) as a dispersing agent. The obtained material is added to 100 ml to 150 ml of the electrolyte.

The electrolyte in which the sample is suspended is subjected to a dispersion treatment using an ultrasonic disperser for 1 minute, and a particle size distribution of particles having a particle diameter of 2 μm to 60 μm is measured by a Coulter Multisizer II using an aperture having an aperture diameter of 100 μm. 50,000 particles are sampled.

Cumulative distributions by volume are drawn from the side of the smallest diameter with respect to particle size ranges (channels) separated based on the measured particle size distribution. The particle diameter when the cumulative percentage becomes 16% is defined as that corresponding to a volume average particle diameter D16v, while the particle diameter when the cumulative percentage becomes 50% is defined as that corresponding to a volume average particle diameter D50v. Furthermore, the particle diameter when the cumulative percentage becomes 84% is defined as that corresponding to a volume average particle diameter D84v.

A volume particle diameter distribution index (GSDv) is calculated as $(D84v/D16v)^{1/2}$.

The average circularity of the powder particles is measured by using a flow type particle image analyzer "FPIA-3000 (manufactured by Sysmex Corporation)". Specifically, 0.1 ml to 0.5 ml of a surfactant (alkyl benzene sulfonate) as a dispersant is added into 100 ml to 150 ml of water obtained by removing impurities which are solid matter in advance, and 0.1 g to 0.5 g of a measurement sample is further added thereto. A suspension in which the measurement sample is dispersed is subjected to a dispersion process with an ultrasonic dispersion device for 1 minute to 3 minutes, and concentration of the dispersion is from 3,000 particles/μl to 10,000 particles/μl. Regarding this dispersion, the average circularity of the powder particles is measured by using the flow type particle image analyzer.

Herein, the average circularity of the powder particles is a value obtained by determining a circularity (Ci) of each of n particles measured for the powder particles and then calculated by the following equation. However, in the following equation, Ci represents a circularity (=circumference length of a circle equivalent to a projected area of the particle/circumference length of a particle projection image), and fi represents frequency of the powder particles.

$$\text{Average circularity}(Ca) = \left(\sum_{i=1}^{n}(Ci \times fi)\right) \bigg/ \sum_{i=1}^{n}(fi) \quad \text{[Expression 1]}$$

External Additive

The oxide particles (TA oxide particles) containing at least one of titania and alumina are applied as the external additive.

Examples of the TA oxide particles include titania particles (single titania particles), alumina particles (single alumina particles), composite particles containing titania and silica, composite particles containing alumina and silica, composite particles containing titania and alumina, and the like. One type of the TA oxide particles may be independently used, and two or more types thereof may be used in combination.

Among them, the titania particles (the single titania particles) and the alumina particles (the single alumina particles) are preferable as the TA oxide particles from the viewpoint of preventing a variation in the smoothness of the coating film.

The volume average particle diameter of the TA oxide particles is preferably from 5 nm to 200 nm, is more preferably from 7 nm to 100 nm, and is even more preferably from 10 nm to 50 nm, from the viewpoint of improving the fluidity of the powder coating material, uniformizing the charging properties of the powder coating material, and preventing a variation in the smoothness of the coating film.

The volume average particle diameter of the TA oxide particles is measured by the following method.

First, the powder coating material which becomes a measurement target is observed by a scanning electron microscope (SEM). Then, equivalent circle diameter of each of 100 TA oxide particles which become a measurement target is obtained by image analysis, and an equivalent circle diameter corresponding to a cumulative percentage of 50% based on volume from a small diameter side in a distribution based on number is set to a volume average particle diameter.

In the image analysis for obtaining the equivalent circle diameter of 100 TA oxide particles which become the measurement target, a two-dimensional image is captured at a magnification of 10,000 times by using an analysis device (ERA-8900: manufactured by ELIONIX INC.), a projected area is obtained in conditions of 0.010000 μm/pixel by using image analysis software WINROOF (manufactured by MITANI CORPORATION), and the equivalent circle diameter is obtained by Expression: Equivalent Circle Diameter=$2\sqrt{(\text{Projected Area}/\pi)}$.

Furthermore, in order to measure the volume average particle diameter of plural types of external additives from the powder coating material, it is necessary to separate each external additive. Specifically, various external additives are subjected to element mapping by using a scanning electron microscope provided with an energy dispersion type X-ray analysis device (SEM-EDX), and an element derived from various external additives is associated with the corresponding external additive, and thus, the external additives are separated.

The surfaces of the TA oxide particles may preferably be subjected to a treatment with a hydrophobizing agent. The hydrophobizing treatment, for example, is performed by dipping inorganic particles into a hydrophobizing agent. The hydrophobizing agent is not particularly limited, and examples of the hydrophobizing agent include a silane coupling agent, silicone oil, a titanate coupling agent, and an aluminum coupling agent. One type of the hydrophobizing agent may be independently used, or two or more types thereof may be used in combination.

In general, the amount of the hydrophobizing agent, for example, is from 1 part by weight to 10 parts by weight with respect to 100 parts by weight of the TA oxide particles.

The externally added amount (the content) of the TA oxide particles is preferably from 0.01 parts by weight to 5 parts by weight, and more preferably from 0.01 parts by weight to 2 parts by weight, with respect to 100 parts by weight of the powder particles, from the viewpoint of improving the fluidity of the powder coating material, uniformizing the charging properties of the powder coating material, and preventing a variation in the smoothness of the coating film.

In addition to the TA oxide particles, other external additives may be used as the external additive.

Examples of the other external additive include particles of $SiO_2$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)n$, $Al_2O_3.2SiO_2$, $CaCO_3$, $MgCO_3$, $BaSO_4$, $MgSO_4$, and the like.

The surface of the other external additive may preferably be subjected to a hydrophobizing treatment. The hydrophobizing treatment, for example, is performed by dipping inorganic particles into a hydrophobizing agent. The hydrophobizing agent is not particularly limited, and examples of the hydrophobizing agent include a silane coupling agent, silicone oil, a titanate coupling agent, and an aluminum coupling agent. One type of the hydrophobizing agent may be independently used, or two or more types thereof may be used in combination.

In general, the amount of the hydrophobizing agent, for example, is from 1 part by weight to 10 parts by weight with respect to 100 parts by weight of the other external additive.

The volume average particle diameter of the other external additive is preferably from 5 nm to 200 nm, is more preferably from 7 nm to 100 nm, and is even more preferably from 10 nm to 50 nm.

The volume average particle diameter of the other external additive is measured by the same method as that of the volume average particle diameter of the TA oxide particles.

The externally added amount (the content) of the external additive is preferably from 0.0001 parts by weight to 2.5 parts by weight, and is more preferably from 0.0001 parts by weight to 1 part by weight, with respect to 100 parts by weight of the powder particles.

Here, as described above, the TA oxide particles and the silica particles may preferably be used in combination as the external additive from the viewpoint of setting the content Ac of the attached TA oxide particles and the content Ao of the TA oxide particles before being sprayed to satisfy the relationship of the expression described above and preventing a variation in the smoothness of the coating film.

Then, in the case where the TA oxide particles and the silica particles are used in combination, from the viewpoint described above, the volume average particle diameter of the TA oxide particles may be from 5 nm to 200 nm (preferably, from 7 nm to 100 nm), the externally added amount (the content) may be from 0.1 parts by weight to 5 parts by weight (preferably, from 0.2 parts by weight to 3 parts by weight) with respect to 100 parts by weight of the powder particles, the volume average particle diameter of the silica particles may be from 5 nm to 200 nm (preferably, from 7 nm to 100 nm), and the externally added amount (the content) may be from 0.1 parts by weight to 5 parts by weight (preferably, from 0.2 parts by weight to 3 parts by weight) with respect to 100 parts by weight of the powder particles.

Method of Preparing Powder Coating Material

Next, a method of preparing the powder coating material according to the exemplary embodiment will be described.

After preparing the powder particles, the powder coating material according to the exemplary embodiment is obtained by externally adding the external additives to the powder particles.

The powder particles may be prepared using any of a dry preparing method (e.g., kneading and pulverization method) and a wet preparing method (e.g., aggregation and coalescence method, suspension and polymerization method, and dissolution and suspension method). The powder particle preparing method is not particularly limited to these preparing methods, and a known preparing method is employed.

For example, examples of the dry preparing method include 1) a kneading and pulverizing method in which the thermosetting resin and other raw materials are kneaded, pulverized, and classified, a dry preparing method in which the shape of the particles obtained by the kneading and pulverizing method is changed by a mechanical impact force or thermal energy, and the like.

On the other hand, example of the wet preparing method include 1) an aggregation and coalescence method in which a dispersion obtained by performing emulsion polymerization with respect to a polymerizable monomer for obtaining the thermosetting resin and a dispersion of the other raw materials are mixed, aggregated, and heated and coalesced, and thus, the powder particles are obtained, 2) a suspension and polymerization method in which the polymerizable monomer for obtaining the thermosetting resin and a solution of the other raw materials are suspended and polymerized in an aqueous solvent, 3) a dissolution and suspension method in which the thermosetting resin and the solution of the other raw materials are suspended and granulated in the aqueous solvent, and the like. Furthermore, the wet preparing method is able to be preferably used from the viewpoint of a small thermal influence.

In addition, the powder particles being the core-shell particles may be obtained by attaching resin particles to the powder particles obtained by the preparing method described above, which are used as a core, followed by heating and coalescing.

Among them, it is preferable that the powder particles are obtained by the aggregation and coalescence method, from the viewpoint of enabling the volume particle diameter distribution index GSDv, the volume average particle diameter D50v, and the average circularity to be easily controlled such that the volume particle diameter distribution index GSDv, the volume average particle diameter D50v, and the average circularity are in the preferable range described above.

Hereinafter, the aggregation and coalescence method of preparing the powder particles which are the core-shell particles will be described as an example.

Specifically, it is preferable that the powder particles are prepared through a step of forming first aggregated particles (a first aggregated particle forming step) by aggregating first resin particles containing a thermosetting resin, and a thermosetting agent in a dispersion in which the first resin particles and the thermosetting agent are dispersed or by aggregating composite particles in a dispersion in which composite particles containing a thermosetting resin and a thermosetting agent are dispersed, a step of forming second aggregated particles (a second aggregated particle forming step) by mixing a first aggregated particle dispersion in which the first aggregated particles are dispersed and a second resin particle dispersion in which second resin particles containing a resin are dispersed, by aggregating the second resin particles on the surface of the first aggregated particles, and by attaching the second resin particles onto the surface of the first aggregated particles, and a step of coalescing the second aggregated particles (a coalescence step) by heating a second aggregated particle dispersion in which the second aggregated particles are dispersed.

Furthermore, in the powder particles prepared by the aggregation and coalescence method, a portion in which the first aggregated particles are coalesced becomes the core, and a portion in which the second resin particles attached onto the surface of the first aggregated particles are coalesced becomes the resin coating portion.

For this reason, powder particles having a single layer structure are able to be obtained insofar as the first aggregated particles formed in the first aggregated particle forming step are supplied to the coalescence step not through the second aggregated particle forming step, and are coalesced instead of the second aggregated particles.

Hereinafter, the details of each of the steps will be described.

Furthermore, in the following description, a preparing method of powder particles containing a colorant will be described, but the colorant is contained, if necessary.

Preparing Step of Each Dispersion

First, each dispersion which is used in the aggregation and coalescence method is prepared.

Specifically, the first resin particle dispersion in which the first resin particles containing the thermosetting resin of the core are dispersed, a thermosetting agent dispersion in which the thermosetting agent is dispersed, a colorant dispersion in which the colorant is dispersed, and the second resin particle dispersion in which the second resin particles containing the resin of the resin coating portion are dispersed are prepared.

In addition, a composite particle dispersion, in which composite particles containing a thermosetting resin for a core and a thermosetting agent are dispersed, is prepared instead of the first resin particle dispersion and the thermosetting agent dispersion.

Furthermore, in each of the steps of the preparing method of the powder coating material, the first resin particles, the second resin particles, and the composite particles will be described by being collectively referred to as "resin particles", and a dispersion of the resin particles will be described by being referred to as a "resin particle dispersion".

Herein, a resin particle dispersion is, for example, prepared by dispersing the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or in combination of two or more kinds thereof.

Examples of the surfactant include anionic surfactants such as sulfuric ester salt, sulfonate, phosphate ester, and soap anionic surfactants; cationic surfactants such as amine salt and quaternary ammonium salt cationic surfactants; and nonionic surfactants such as polyethylene glycol, alkyl phenol ethylene oxide adduct, and polyol nonionic surfactants. Among these, anionic surfactants and cationic surfactants are particularly used. Nonionic surfactants may be used in combination with anionic surfactants or cationic surfactants.

The surfactants may be used alone or in combination of two or more kinds thereof.

Regarding the resin particle dispersion, as a method of dispersing the resin particles in the dispersion medium, a common dispersing method using, for example, a rotary shearing-type homogenizer, or a ball mill, a sand mill, or a Dyno mill having media is exemplified. Depending on the kind of the resin particles, the resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding a base to an organic continuous phase (O phase); and converting the resin (so-called phase inversion) from W/O to O/W by adding an aqueous medium (W phase) to form a discontinuous phase, thereby dispersing the resin as particles in the aqueous medium.

Specifically, examples of a preparation method of the resin particle dispersion include the following methods.

For example, when the resin particle dispersion is a polyester resin particle dispersion in which polyester resin particles are dispersed, such a polyester resin particle dispersion is able to be obtained by heating and melting a raw material monomer and by polycondensing the raw material monomer under reduced pressure, and then by adding the obtained polycondensate to a solvent (for example, ethyl acetate) and by dissolving the polycondensate in the solvent, by stirring the obtained dissolved material while adding a weak alkaline aqueous solution thereto, and by performing phase inversion and emulsion with respect to the dissolved material.

Furthermore, when the resin particle dispersion is the composite particle dispersion, the composite particle dispersion is able to be obtained by mixing the thermosetting resin and the thermosetting agent, followed by dispersing in a dispersion medium (for example, performing emulsification such as phase inversion and emulsion).

The volume average particle diameter of the resin particles dispersed in the resin particle dispersion is, for example, preferably equal to or smaller than 1 µm, more preferably from 0.01 µm to 1 µm, even more preferably from 0.08 µm to 0.8 µm, and still more preferably from 0.1 µm to 0.6 µm.

Regarding the volume average particle diameter of the resin particles, a cumulative distribution by volume is drawn from the side of the smallest diameter with respect to particle size ranges (channels) separated using the particle size distribution obtained by the measurement with a laser diffraction-type particle size distribution measuring device (for example, LA-700 manufactured by Horiba, Ltd.), and a particle diameter when the cumulative percentage becomes 50% with respect to the entire particles is measured as a volume average particle diameter D50v. The volume average particle diameter of the particles in other dispersions is also measured in the same manner.

Here, in order to prepare the resin particle dispersion, a known emulsion method is able to be used, and a phase inversion and emulsion method is effective in which a particle diameter distribution to be obtained is narrow, and a volume average particle diameter is easily in a range of less than or equal to 1 µm (in particular, from 0.08 µm to 0.40 µm).

In the phase inversion and emulsion method, the resin is dissolved in an organic solvent dissolving the resin, and an independent amphiphilic organic solvent or a mixed solvent, and thus, is in an oil phase. A small amount of basic compound is dropped while stirring the oil phase, water is slightly dropped while further stirring the oil phase, and thus, a water droplet is incorporated in the oil phase. Next, when the dropping amount of water is greater than a certain amount, the oil phase and the water phase are inverted, and thus, the oil phase becomes an oil droplet. After that, a water dispersion is able to be obtained through a desolvation step of depressurization.

The amphiphilic organic solvent indicates a solvent having solubility with respect to water at 20° C. is at least greater than or equal to 5 g/L, and is preferably greater than or equal to 10 g/L. When the solubility is less than 5 g/L, an effect of accelerating the speed of an aqueous treatment deteriorates, and storage stability of a water dispersion to be obtained also deteriorates. In addition, examples of the amphiphilic organic solvent include alcohols such as ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol, ketones such as methyl ethyl ketone, methyl isobutyl ketone, ethyl butyl ketone, cyclohexanone, and isophorone, ethers such as tetrahydrofuran and dioxane, esters such as ethyl acetate, n-propyl acetate, isopropyl acetate, n-butyl acetate, isobutyl acetate, sec-butyl acetate, 3-methoxy butyl acetate, methyl propionate, ethyl propionate, diethyl carbonate, and dimethyl carbonate, glycol derivatives such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monopropyl ether, diethylene glycol monobutyl ether, diethylene glycol ethyl ether acetate, propylene glycol, propylene glycol monomethyl ether, propylene glycol monopropyl ether, propylene glycol monobutyl ether, propylene glycol methyl ether acetate, and dipropylene glycol monobutyl ether, 3-methoxy-3-methyl butanol, 3-methoxy butanol, acetonitrile, dimethyl formamide, dimethyl acetoamide, diacetone alcohol, acetoethyl acetate, and the like. The solvent is able to be independently used, or two or more types thereof are able to be used by being mixed.

Furthermore, the thermosetting polyester resin as the thermosetting resin is neutralized by a basic compound at the time of being dispersed in a water medium. A neutralization reaction with respect to the carboxyl group of the thermosetting polyester resin is an aqueous starting force, and the coalescence between the particles is easily prevented by an electricity repellent force between the generated carboxyl anions.

Examples of the basic compound include ammonia, an organic amine compound having a boiling point of lower than or equal to 250° C., and the like. Preferable examples of the organic amine compound include triethyl amine, N,N-diethyl ethanol amine, N,N-dimethyl ethanol amine, aminoethanol amine, N-methyl-N,N-diethanol amine, isopropyl amine, iminobispropyl amine, ethyl amine, diethyl amine, 3-ethoxy propyl amine, 3-diethyl aminopropyl amine, sec-butyl amine, propyl amine, methyl aminopropyl amine, dimethyl aminopropyl amine, methyl iminobispropyl amine, 3-methoxy propyl amine, monoethanol amine, diethanol amine, triethanol amine, morpholine, N-methyl morpholine, N-ethyl morpholine, and the like.

The basic compound is added in the amount in which the basic compound is able to be at least partially neutralized according to the carboxyl group included in the thermosetting polyester resin, that is, the basic compound is preferably added in the amount of 0.2 times to 9.0 times equivalent to the carboxyl group, and is more preferably added in the amount of 0.6 times to 2.0 times equivalent to the carboxyl group. When the basic compound is added in the amount of greater than or equal to 0.2 times equivalent to the carboxyl group, an effect of adding the basic compound is easily confirmed. When the basic compound is added in the amount of less than or equal to 9.0 times equivalent to the carboxyl group, the particle diameter distribution hardly widens and an excellent dispersion is able to be easily obtained, and it is considered that this is because hydrophilicity of the oil phase is prevented from excessively increasing.

The content of the resin particles contained in the resin particle dispersion is, for example, preferably from 5% by weight to 50% by weight, and more preferably from 10% by weight to 40% by weight.

For example, the thermosetting agent dispersion and the colorant dispersion are also prepared in the same manner as in the case of the resin particle dispersion. That is, the volume average particle diameter, the dispersion medium, the dispersing method, and the content of the particles of the colorant dispersed in the colorant dispersion and the particles of the thermosetting agent dispersed in the thermosetting agent dispersion are the same as those of the resin particles in the resin particle dispersion.

First Aggregated Particle Forming Step

Next, the first resin particle dispersion, the thermosetting agent dispersion, and the colorant dispersion are mixed with each other.

The first resin particles, the thermosetting agent, and the colorant are heterogeneously aggregated in the mixed dispersion, thereby forming first aggregated particles having a diameter near a target powder particle diameter and including the first resin particles, the thermosetting agent, and the colorant.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature of a glass transition temperature of the first resin particles (specifically, for example, from a temperature 30° C. lower than the glass transition temperature of the first resin particles to a temperature 10° C. lower than the glass transition temperature thereof) to aggregate the particles dispersed in the mixed dispersion, thereby forming the first aggregated particles.

In the first aggregated particle forming step, the first aggregated particles may be formed by mixing the composite particle dispersion including the thermosetting resin and the thermosetting agent, and the colorant dispersion with each other and heterogeneously aggregating the composite particles and the colorant in the mixed dispersion.

In the first aggregated particle forming step, for example, the aggregating agent may be added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the heating may then be performed.

Examples of the aggregating agent include a surfactant having an opposite polarity to the polarity of the surfactant used as the dispersing agent to be added to the mixed dispersion, metal salt, a metal salt polymer, and a metal complex. When a metal complex is used as the aggregating agent, the amount of the surfactant used is reduced and charging characteristics are improved.

After completing the coalescence, an additive for forming a complex or a similar bond with metal ion of the aggregating agent may be used, if necessary. A chelating agent is suitably used as this additive. With the addition of this chelating agent, the content of the metal ion of the powder particles may be adjusted, when the aggregating agent is excessively added.

Herein, the metal salt, the metal salt polymer, or the metal complex as the aggregating agent is used as a supply source of the metal ions. These examples are as described above.

A water-soluble chelating agent is used as the chelating agent. Specific examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 parts by weight to 5.0 parts by weight, and more preferably from 0.1 parts by weight to less than 3.0 parts by weight with respect to 100 parts by weight of the resin particles.

Second Aggregated Particle Forming Step

Next, the obtained first aggregated particle dispersion in which the first aggregated particles are dispersed is mixed together with the second resin particle dispersion.

The second resin particles may be the same kind as the first resin particles or may be an irregular kind therefrom.

Aggregation is performed such that the second resin particles are attached to the surface of the first aggregated particles in the mixed dispersion in which the first aggregated particles and the second resin particles are dispersed, thereby forming second aggregated particles in which the second resin particles are attached to the surface of the first aggregated particles.

Specifically, in the first aggregated particle forming step, for example, when the particle diameter of the first aggregated particles reaches a target particle diameter, the second resin particle dispersion is mixed with the first aggregated particle dispersion, and the mixed dispersion is heated at a temperature equal to or lower than the glass transition temperature of the second resin particles.

By setting pH of the mixed dispersion to be in a range of 6.5 to 8.5, for example, the progress of the coalescence is stopped.

Accordingly, the second aggregated particles aggregated in such a way that the second resin particles are attached to the surface of the first aggregated particles are obtained.

Coalescence Step

Next, the second aggregated particle dispersion in which the second aggregated particles are dispersed is heated at, for example, a temperature that is equal to or higher than the glass transition temperature of the first and second resin particles (for example, a temperature that is higher than the glass transition temperature of the first and second resin particles by 10° C. to 30° C.) to coalesce the second aggregated particles and form the powder particles.

The powder particles are obtained through the foregoing step.

Herein, after the coalescence step ends, the powder particles formed in the dispersion are subjected to a washing step, a solid-liquid separation step, and a drying step, that are well known, and thus, dry powder particles are obtained.

In the washing step, preferably displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is prepared by adding and mixing an external additive to the obtained dry powder particles.

The mixing is preferably performed with, for example, a V-blender, a HENSCHEL mixer, a Lbdige mixer, or the like.

Furthermore, if necessary, coarse particles of the powder particle may be removed using a vibration sieving machine, a wind classifier, or the like.

EXAMPLES

Hereinafter, this exemplary embodiment will be described in detail with reference to examples, and this exemplary embodiment is not limited to the examples. Furthermore, in the following description, unless otherwise particularly stated, both of "parts" and "%" are based on the weight.

Preparation of External Additive (TA Oxide Particles)

Preparation of Alumina Particles A 30 parts by weight of AEROXIDE Alu 130 (alumina particles) manufactured by NIPPON AEROSIL CO., LTD. and 100 parts by weight of methyl isobutyl ketone are put into a reactor equipped with a stirring device, a thermometer, a reflux pipe provided with Dean-Stark trap, and a dropping funnel, 10 parts by weight of dimethyl {2-methyl-3-(methylamino) propyl}trimethoxy silane is further added thereto with stirring, the mixture is heated and held at 80° C. for 8 hours, and a treatment is performed by using a silane coupling agent.

After that, a solvent component is subjected to vacuum distillation at a temperature of 40° C. and a degree of vacuum of 15 to 20 mmHg for 1 hour, the resultant is heated at 60° C., and is continuously subjected to vacuum distillation for 30 minutes, and thus, alumina particles A which have been subjected to a surface treatment using a silane coupling agent having an amino group are obtained. The volume average particle diameter of the alumina particles A is 8.0 nm.

Preparation of Silica Particles E 30 parts of AEROSIL 300 (a volume average particle diameter of 7.0 nm) manufactured by NIPPON AEROSIL CO., LTD. as a silicon dioxide ($SiO_2$) sol and 100 parts of methyl isobutyl ketone are put into a reactor including a stirring device, a thermometer, a reflux pipe provided with a Dean-Stark trap, and a dropping funnel, 10 parts of dimethyl {2-methyl-3-(methylamino) propyl} trimethoxy silane is further added thereto with stirring, the mixture is heated and held at 80° C. for 8 hours, and a treatment is performed by using a silane coupling agent.

After that, a solvent component is subjected to vacuum distillation at a temperature of 40° C. and a degree of vacuum of 15 to 20 mmHg for 1 hour, the resultant is heated at 60° C., and is continuously subjected to vacuum distillation for 30 minutes, and thus, silica particles E which have been subjected to a surface treatment using a silane coupling agent having an amino group are obtained. The volume average particle diameter D50v of the silica particles E is 8.0 nm.

Preparation of Polyester Resin Red Powder Coating Material

Polyester Resin Red Powder Coating Material (PCC1)

Preparation of Colorant Dispersion (C1)

Red Pigment (manufactured by Dainichiseika Color & Chemicals Mfg. Co., Ltd., Seika Fast Red 1531B: 100 parts by weight Anionic Surfactant (manufactured by DKS Co. Ltd.: Neogen RK): 15 parts by weight Ion Exchange Water: 450 parts by weight The compositions described above are mixed and are dissolved, and are dispersed for 1 hour by using a high pressure impact type disperser Ultimizer (HJP30006, manufactured by SUGINO MACHINE LIMITED), and thus, a colorant dispersion formed by dispersing a colorant (the red pigment) is prepared. The average particle diameter of the colorant (the red pigment) in the colorant dispersion is 0.13 μm, and a solid content ratio of the colorant dispersion is 25%.

Preparation of White Pigment Dispersion (W1)

Titanium Oxide (A-220, manufactured by ISHIHARA SANGYO KAISHA, LTD.): 100 parts by weight Anionic Surfactant (NEOGEN RK, manufactured by DKS Co. Ltd.): 15 parts by weight Ion Exchange Water: 400 parts by weight Nitric Acid of 0.3 M: 4 parts by weight The compositions described above are mixed and are dissolved, and are dispersed for 3 hours by using a high pressure impact type disperser Ultimizer (HJP30006, manufactured by SUGINO MACHINE LIMITED), and thus, a white pigment dispersion formed by dispersing titanium oxide is prepared. Measurement is performed by using a laser diffraction particle diameter measurement machine, and thus, the average particle diameter of the titanium oxide in the pigment dispersion is 0.25 μm, and a solid content ratio of the white pigment dispersion is 25%.

Preparation of Polyester Resin and Curing Agent Composite Dispersion (E1)

A mixed solvent of 180 parts by weight of ethyl acetate and 80 parts by weight of isopropyl alcohol is put into a 3-liter reaction vessel provided with a jacket (BJ-30N, manufactured by TOKYO RIKAKIKAI CO, LTD.) which includes a condenser, a thermometer, a water dropping device, and an anchor blade while maintaining the reaction vessel in a water circulation type thermostatic bath at 40° C., and the following compositions are put into the vessel.

Polyester Resin (PES1) [Polycondensate of Terephthalic Acid/Ethylene Glycol/Neopentyl Glycol/Trimethylol Propane (Molar Ratio=100/60/38/2 (mol %), Glass Transition Temperature=62° C., Acid Value (Av)=12 mgKOH/g, Hydroxyl Value (OHv)=55 mgKOH/g, Weight Average Molecular Weight (Mw)=12,000, and Number Average Molecular Weight (Mn)=4,000]: 240 parts by weight Blocked Isocyanate Curing Agent VESTAGON B 1530 (manufactured by Evonik Japan Co., Ltd.): 60 parts by weight Benzoin: 1.5 parts by weight Acrylic Oligomer (ACRONAL 4F, manufactured by BASF SE): 3 parts by weight After the above components are put thereinto, the resultant is stirred at 150 rpm using a three-one motor to perform dissolution, thereby preparing an oil phase. A mixed liquid of 1 part by weight of an ammonia aqueous solution of 10% by weight and 47 parts by weight of an aqueous solution of sodium hydroxide of 5% by weight is dropped into the oil phase being stirred, over 5 minutes and is mixed for 10 minutes, and then, 900 parts by weight of ion exchange water is further dropped thereinto at a rate of 5 parts by weight per a minute, and thus, a phase inversion is performed to thereby obtain an emulsion liquid.

Immediately, 800 parts by weight of the obtained emulsion liquid and 700 parts by weight of ion exchange water are put into an eggplant 2 L-flask, are set in an evaporator provided with a vacuum control unit (manufactured by TOKYO RIKAKIKAI CO, LTD.) through a trap bulb. The eggplant flask is heated in a hot water bath at 60° C. while being rotated, and a solvent is removed by reducing the pressure to 7 kPa while being careful of bumping. When the collected amount of the solvent becomes 1100 parts by weight, the pressure returns to the normal pressure, and the eggplant flask is cooled, and thus, a dispersion is obtained. There is no solvent odor in the obtained dispersion. The volume average particle of resin particles in the dispersion is 145 nm. After that, 2% by weight of an anionic surfactant (DOWFAX2A1, manufactured by The Dow Chemical Company, Amount of Effective Component: 45% by weight) is added and mixed to the resin of the dispersion as an effective component, and adjustment is performed such that a solid concentration becomes 25% by weight by adding ion exchange water thereto. This is designated as a polyester resin and curing agent composite dispersion (E1).

Preparation of Red Powder Particles (PC1)

Aggregation Step

Polyester Resin and Curing Agent Composite Dispersion (E1): 180 parts by weight (Solid of 45 parts by weight)

White Pigment Dispersion (W1): 160 parts by weight (Solid of 40 parts by weight)

Colorant Dispersion (C1): 8 parts by weight (Solid of 2 parts by weight)

Ion Exchange Water: 200 parts by weight

The compositions described above are sufficiently mixed and dispersed in a round stainless steel flask by using a homogenizer (ULTRA-TURRAX T50, manufactured by IKA Works GmbH & Co.). Next, the pH is adjusted to be 3.5 by using a 1.0% aqueous solution of a nitric acid. 0.50 parts by weight of a 10% aqueous solution containing polyaluminum chloride is added thereto, and a dispersing operation is continuously performed by using ULTRA-TURRAX.

A stirrer and a mantle heater are disposed, the temperature is increased up to 50° C. while suitably adjusting the number of rotations of the stirrer such that slurry is sufficiently stirred, the slurry is held at 50° C. for 15 minutes, and then the particle diameter of aggregated particles is measured by using [TA-II] type Coulter Counter (manufactured by Beckman Coulter, Inc., Aperture Diameter: 50 μm), and when the volume average particle diameter becomes 5.5 μm, 60 parts by weight of the polyester resin and curing agent composite dispersion (E1) is slowly put into the flask as a shell (the shell is put into the flask).

Coalescence Step

The flask is held for 30 minutes after the polyester resin and curing agent composite dispersion (E1) is put thereinto, and then, pH is set to 7.0 by using a 5% aqueous solution of sodium hydroxide. After that, the temperature is increased up to 85° C. and is held for 2 hours.

Filtering, Washing, and Drying Step

After the reaction ends, a solution in the flask is cooled and is filtered, and thus, a solid is obtained. Next, the solid is sufficiently washed with ion exchange water, and then, solid liquid separation is performed by Nutsche type suction filtration, and thus, a solid is obtained again.

Next, the solid is dispersed again in 3 liters of ion exchange water at 40° C., and is stirred and washed at 300 rpm for 15 minutes. The washing operation is repeated 5 times, the solid obtained by performing the solid liquid separation according to the Nutsche type suction filtration is subjected to vacuum drying for 12 hours, and thus, transparent powder particles (PC1) are obtained.

When the particle diameter of the red powder coating material particles is measured, the volume average particle diameter D50v is 6.1 µm, the volume particle diameter distribution index GSDv is 1.24, and the average circularity is 0.98, and thus, the powder coating material particles are approximately in the shape of a sphere.

Preparation of Polyester Resin Red Powder Coating Material (PCC1)

100 parts by weight of red powder particles (PC1) and 0.5 parts by weight of the alumina particles A are mixed by using a Henschel mixer at a peripheral speed of 32 m/s for 10 minutes, and then, coarse particles are removed by using a sieve having a mesh size of 45 µm, and thus, a polyester resin red powder coating material (PCC1) is obtained.

Polyester Resin Red Powder Coating Material (PCC2)

Red powder particles (PC2) are obtained by the same method as that of the red powder particles (PC1) except that when the volume average particle diameter of the aggregated particles becomes 6.5 µm in the aggregation step of the preparation of the red powder particles (PC1), 60 parts by weight of the polyester resin and curing agent composite dispersion (E1) is slowly put into the flask as the shell. Then, a polyester resin red powder coating material (PCC2) is obtained by the same method as that of the polyester resin red powder coating material (PCC1) except that the red powder particles (PC2) are used.

Furthermore, the volume average particle diameter D50v of the red powder coating material particles (PCC2) is 7.2 µm, and the volume particle diameter distribution index GSDv is 1.25. The average circularity is 0.98, and thus, the red powder coating material particles are approximately in the shape of a sphere.

Polyester Resin Red Powder Coating Material (PCC3)

Red powder particles (PC3) are obtained by the same method as that of the red powder particles (PC1) except that when the volume average particle diameter of the aggregated particles becomes 7.8 µm in the aggregation step of the preparation of the red powder particles (PC1), 60 parts by weight of the polyester resin and curing agent composite dispersion (E1) is slowly put into the flask as the shell. Then, a polyester resin red powder coating material (PCC3) is obtained by the same method as that of the polyester resin red powder coating material (PCC1) except that the red powder particles (PC3) are used.

Furthermore, the volume average particle diameter D50v of the red powder coating material particles (PCC3) is 8.5 µm, and the volume particle diameter distribution index GSDv is 1.22. The average circularity is 0.98, and thus, the red powder coating material particles are approximately in the shape of a sphere.

Polyester Resin Red Powder Coating Material (PCC4)

Red powder particles (PC4) are obtained by the same method as that of the red powder particles (PC1) except that when the volume average particle diameter of the aggregated particles becomes 9.0 µm in the aggregation step of the preparation of the red powder particles (PC1), 60 parts by weight of the polyester resin and curing agent composite dispersion (E1) is slowly put into the flask as the shell. Then, a polyester resin red powder coating material (PCC4) is obtained by the same method as that of the polyester resin red powder coating material (PCC1) except that the red powder particles (PC4) are used.

Furthermore, the volume average particle diameter D50v of the red powder coating material particles (PCC4) is 10.1 µm, and the volume particle diameter distribution index GSDv is 1.27. The average circularity is 0.97, and thus, the red powder coating material particles are approximately in the shape of a sphere.

Polyester Resin Red Powder Coating Material (PCC5)
Polyester Resin (PES1): 65 parts by weight
Block Isocyanate Curing Agent VESTAGONB1530 (manufactured by Evonik Japan Co., Ltd.): 13 parts by weight
Titanium Oxide (A-220, manufactured by ISHIHARA SANGYO KAISHA, LTD.): 20 parts by weight
Magenta Pigment (C.I.R122 (ChROMOFINE MAGENTA 6886) manufactured by Dainichiseika Color & Chemicals Mfg. Co., Ltd.): 2 parts by weight The compositions described above are mixed and are dissolved, and are kneaded and pulverized, and thus, red powder particles (PC5) are obtained. Then, a polyester resin red powder coating material (PCC5) is obtained by the same method as that of the polyester resin red powder coating material (PCC1) except that the red powder particles (PC5) are used.

Furthermore, the volume average particle diameter D50v of the red powder coating material particles (PCC5) is 11.3 m, and the volume particle diameter distribution index GSDv is 1.56. The average circularity is 0.91, and thus, the red powder coating material particles have an irregular shape.

Polyester Resin Red Powder Coating Material (PCC6)

Red powder particles (PC6) are obtained by the same method as that of the red powder particles (PC5) except that when the volume average particle diameter of the aggregated particles becomes 9.2 µm in the aggregation step of the preparation of the red powder particles (PC5), 60 parts by weight of the polyester resin and curing agent composite dispersion (E1) is slowly put into the flask as the shell. Then, a polyester resin red powder coating material (PCC6) is obtained by the same method as that of the polyester resin red powder coating material (PCC5) except that the red powder particles (PC6) are used.

Furthermore, the volume average particle diameter D50v of the red powder coating material particles (PCC6) is 12.1 µm, and the volume particle diameter distribution index GSDv is 1.27. The average circularity is 0.92, and thus, the red powder coating material particles have an irregular shape.

Polyester Resin Red Powder Coating Material (PCC7)

100 parts by weight of the red powder particles (PC3), 0.5 parts by weight of the alumina particles A, and 0.2 parts by weight of the silica particles E are mixed by using a Henschel mixer at a peripheral speed of 32 m/s for 10 minutes, and then, coarse particles are removed by using a sieve having a mesh size of 45 µm, and thus, a polyester resin red powder coating material (PCC7) is obtained.

Furthermore, the volume average particle diameter D50v of the red powder coating material particles (PCC7) is 8.5 µm, and the volume particle diameter distribution index GSDv is 1.22. The average circularity is 0.98, and thus, the red powder coating material particles are approximately in the shape of a sphere.

Polyester Resin Red Powder Coating Material (PCC8)

100 parts by weight of the red powder particles (PC3), 0.5 parts by weight of the alumina particles A, and 0.5 parts by weight of the silica particles E are mixed by using a Henschel mixer at a peripheral speed of 32 m/s for 10 minutes, and then, coarse particles are removed by using a sieve having a mesh size of 45 μm, and thus, a polyester resin red powder coating material (PCC8) is obtained.

Furthermore, the volume average particle diameter D50v of the red powder coating material particles (PCC8) is 8.5 μm, and the volume particle diameter distribution index GSDv is 1.22. The average circularity is 0.98, and thus, the red powder coating material particles are approximately in the shape of a sphere.

Examples 1 to 6 and Comparative Examples 1 to 2

Electrostatic powder coating is performed as follows by using each of the powder coating materials (PCC1) to (PCC8).

Electrostatic Powder Coating

The powder coating material is put into a corona gun XR4-110C manufactured by ASAHI SUNAC CORPORATION. Furthermore, the powder coating material to be put into the corona gun corresponds to a powder coating material before being sprayed (a new product).

Then, a corona gun XR4-110C manufactured by ASAHI SUNAC CORPORATION is vertically and horizontally slid with respect to a square test panel (an object to be coated) of 30 cm×30 cm of a mirror finished aluminum plate by a distance of 30 cm from a panel front surface (a distance between the panel and a spray port of the corona gun), and thus, the powder coating material is sprayed and is electrostatically attached to the panel. The applied voltage of the corona gun is set to 80 kV, the input air pressure is set to 0.55 MPa, the discharge amount is set to 200 g/minute, and the attachment amount of the powder coating material which is attached to the panel is set to from 4.0 g/m² to 6.0 g/m².

Then, the panel to which the powder coating material is electrostatically attached is put into a high temperature chamber which is set to 180° C., and is heated (baked) for 30 minutes. Thus, the panel is subjected to electrostatic powder coating by using an electrostatic powder before being sprayed (a new product).

Here, in the same conditions described above, the powder coating material is electrostatically attached to the panel. Then, the powder coating material which has been electrostatically attached to the panel is collected, and the content Ac of the TA oxide particles in the attached powder coating material (the attached TA oxide particles) is measured. In addition, the content Ao of the TA oxide particles in the powder coating material before being sprayed (the TA oxide particles before being sprayed) is also measured.

On the other hand, the powder coating material which has not been electrostatically attached to the panel is collected, and the collected powder coating material and the powder coating material before being sprayed (a new product) are mixed at a weight ratio of 50:50, and thus, a mixed powder coating material is obtained. Then, in the same conditions described above, the panel is subjected to electrostatic powder coating by using the mixed powder coating material.

Furthermore, the content Ac and the content Ao of the TA oxide particles are measured by the following method.

First, the content of the TA oxide particles is calculated by the following calculation formula.

Calculation Formula

Content of $TA$ Oxide Particles=$100 \times IS/(IS+CS)$

In the calculation formula, CS represents the carbon content of the powder particles which is measured by fluorescent X-ray analysis, and IS represents the total content of metal of the TA oxide particles which is measured by fluorescent X-ray analysis.

In general, the main component of the powder particles is a resin, and the element mainly constituting the resin is carbon. On the other hand, inorganic oxide particles in the TA oxide particles are denoted by MOx (M represents a metal element, and x represents a natural number), and the element mainly constituting the TA oxide particles is M (titanium, aluminum, titanium and aluminum, and the like). That is, the total content of metal in the TA oxide particles is the total content of M.

Element Measurement Method Using Fluorescent X-Ray Analysis 4 g of the powder coating material which becomes a measurement target is subjected to pressure molding at 10 t (10,000 kg) for 1 minute by using a pressure molding machine.

The obtained measurement sample is measured in measurement conditions of qualitative and quantitative measurement, a tube voltage of 60 KV, a tube current of 50 mA, and a measurement time of 40 deg/min using a scanning fluorescent X-ray analysis device ZSX PRIMUS II manufactured by Rigaku Corporation.

The carbon content and the element such as metal element (Si, Ti, Al, Cu, Zn, Sn, Ce, Fe, Mg, Ba, Ca, K, Na, Zr, and Ca) are measured. The content Ac and the content Ao of the TA oxide particles are calculated from the calculation formula described above by using the carbon content of the powder particles and the total content of metal in the TA oxide particles which are measured according to the method.

Smoothness Evaluation of Coating Film

For a coating film (in the table, described as "Coating Film of New Product") at the time of performing the electrostatic powder coating with respect to the panel by using the powder coating material before being sprayed (the new product) and a coating film (in the table, described as "Coating Film of Collected Product") at the time of performing the electrostatic powder coating with respect to the panel by using the mixed powder coating material, center line average roughness (hereinafter, described as "Ra", Unit: μm) is measured by using a surface roughness measurement machine (SURFCOM 1400A, manufactured by TOKYO SEIMITSU CO., LTD.). The center line average roughness indicates that surface smoothness decreases as the number of Ra becomes larger.

The details and the evaluation results of the examples and the comparative examples are collectively shown in Table 1.

TABLE 1

| | | Powder Coating Material before being Sprayed (New Product) | | | | | |
|---|---|---|---|---|---|---|---|
| | | Powder Particles | | | TA Oxide Particles | | Silica Particles |
| | No. | D50v (μm) | GSDv | Average Circularity | Type | Content Ao (%) | Content (%) |
| Example 1 | PCC1 | 6.1 | 1.24 | 0.98 | Alumina Particles A | 0.50 | |

TABLE 1-continued

| | | | | | | | |
|---|---|---|---|---|---|---|---|
| Example 2 | PCC2 | 7.2 | 1.25 | 0.98 | Alumina Particles A | 0.50 | |
| Example 3 | PCC3 | 8.5 | 1.22 | 0.98 | Alumina Particles A | 0.50 | |
| Example 4 | PCC4 | 10.1 | 1.27 | 0.97 | Alumina Particles A | 0.50 | |
| Example 5 | PCC7 | 8.5 | 1.22 | 0.98 | Alumina Particles A | 0.50 | 0.2 |
| Example 6 | PCC8 | 8.5 | 1.22 | 0.98 | Alumina Particles A | 0.50 | 0.5 |
| Comparative Example 1 | PCC5 | 11.3 | 1.56 | 0.91 | Alumina Particles A | 0.50 | |
| Comparative Example 2 | PCC6 | 12.1 | 1.37 | 0.91 | Alumina Particles A | 0.50 | |

| | | | Smoothness of Coating Film | |
|---|---|---|---|---|
| | Electrostatically Attached Powder Coating Material TA Oxide Particles Content Ac (%) | Variation in Amount of TA Oxide Particles (Ac/Ao) | Surface Roughness Ra of Coating Film of New Product (μm) | Surface Roughness Ra of Coating Film of Collected Product (μm) |
| Example 1 | 0.41 | 0.82 | 0.070 | 0.078 |
| Example 2 | 0.45 | 0.9 | 0.052 | 0.060 |
| Example 3 | 0.50 | 1.0 | 0.042 | 0.050 |
| Example 4 | 0.558 | 1.16 | 0.075 | 0.095 |
| Example 5 | 0.50 | 1.0 | 0.042 | 0.045 |
| Example 6 | 0.50 | 1.0 | 0.055 | 0.056 |
| Comparative Example 1 | 0.35 | 0.70 | 0.065 | 0.097 |
| Comparative Example 2 | 0.65 | 1.3 | 0.080 | 0.155 |

From the results described above, it is found that, in this example, a difference in surface roughness a between the coating film of the new product and the coating film of the collected product is small, and a variation in smoothness of a coating film which occurs at the time of reusing the powder coating material collected without being electrostatically attached to an object to be coated is prevented, compared to the comparative example.

Preparation of Polyester Resin Clear Red Powder Coating Material

Polyester Resin Clear Red Powder Coating Material (PCC101)

Aggregation Step

Polyester Resin and Curing Agent Composite Dispersion (E1): 306 parts by weight (Solid content of 77 parts by weight)

Colorant Dispersion (C1): 40 parts by weight (Solid content of 10 parts by weight)

Ion Exchange Water: 200 parts by weight

The compositions described above are sufficiently mixed and dispersed in a round stainless steel flask by using a homogenizer (ULTRA-TURRAX T50, manufactured by IKA Works GmbH & Co.). Next, pH is adjusted to be 3.5 by using a 1.0% aqueous solution of a nitric acid. 0.50 parts by weight of a 10% aqueous solution of polyaluminum chloride is added thereto, and a dispersing operation is continuously performed by using ULTRA-TURRAX.

A stirrer and a mantle heater are disposed, the temperature is increased up to 50° C. while suitably adjusting the number of rotations of the stirrer such that slurry is sufficiently stirred, the slurry is held at 50° C. for 15 minutes, and then the particle diameter of aggregated particles is measured by using [TA-IT] type Coulter Counter (manufactured by Beckman Coulter, Inc., Aperture Diameter: 50 μm), and when the volume average particle diameter becomes 5.5 μm, 60 parts by weight of the polyester resin and curing agent composite dispersion (E1) is slowly put into the flask as a shell (the shell is put into the flask).

Coalescence Step

The flask is held for 30 minutes after the polyester resin and curing agent composite dispersion (E1) is put thereinto, and then, pH is set to 7.0 by using a 5% aqueous solution of sodium hydroxide. After that, the temperature is increased up to 85° C. and is held for 2 hours.

Filtering, Washing, and Drying Step

After the reaction ends, a solution in the flask is cooled and is filtered, and thus, a solid is obtained. Next, the solid is sufficiently washed with ion exchange water, and then, solid liquid separation is performed by Nutsche type suction filtration, and thus, a solid is obtained again.

Next, the solid is dispersed again in 3 liters of ion exchange water at 40° C., and is stirred and washed at 300 rpm for 15 minutes. The washing operation is repeated 5 times, the solid obtained by performing the solid liquid separation according to the Nutsche type suction filtration is subjected to vacuum drying for 12 hours, and thus, clear red powder particles (PC101) are obtained.

When the particle diameter of the clear red powder coating material particles is measured, the volume average particle diameter D50v is 6.1 μm, and the volume particle diameter distribution index GSDv is 1.24. The average circularity is 0.985, and thus, the clear red powder coating material particles are approximately in the shape of a sphere.

Preparation of Polyester Resin Clear Red Powder Coating Material (PCC101)

100 parts by weight of the clear red powder particles (PC101) and 0.5 parts by weight of titania particles A (TA oxide particles "STT-65C (manufactured by Titan Kogyo, Ltd.)", Volume Average Particle Diameter=40 μm) are mixed by using a Henschel mixer at a peripheral speed of 32 m/s for 10 minutes, and then, coarse particles are removed by using a sieve having a mesh size of 45 µm, and thus, a polyester resin clear red powder coating material (PCC101) is obtained.

Polyester Resin Clear Red Powder Coating Material (PCC102)

Clear red powder particles (PC102) are obtained by the same method as that of the clear red powder particles (PC101) except that when the volume average particle diameter of the aggregated particles becomes 5.5 µm in the aggregation step of the preparation of the clear red powder particles (PCC101), 60 parts by weight of the polyester resin and curing agent composite dispersion (E1) is slowly put into the flask as the shell. Then, a polyester resin clear red powder coating material (PCC102) is obtained by the same method as that of the polyester resin clear red powder coating material (PCC101) except that the clear red powder particles (PC102) are used.

Furthermore, the volume average particle diameter D50v of the clear red powder coating material particles (PCC102) is 10.5 µm, and the volume particle diameter distribution index GSDv is 1.26. The average circularity is 0.981, and thus, the clear red powder coating material particles are approximately in the shape of a sphere.

Polyester Resin Clear Red Powder Coating Material (PCC103)

A polyester resin clear red powder coating material (PCC103) is obtained by the same method as that of the polyester resin clear red powder coating material (PCC101) except that the amount of the titania particles A as the external additive (the TA oxide particles) is 0.1 parts by weight.

Polyester Resin Clear Red Powder Coating Material (PCC104)

A polyester resin clear red powder coating material (PCC104) is obtained by the same method as that of the polyester resin clear red powder coating material (PCC101) except that the amount of the titania particles A as the external additive (the TA oxide particles) is 0.8 parts by weight.

Polyester Resin Clear Red Powder Coating Material (PCC105)

Polyester Resin (PES101): 81 parts by weight
  Block Isocyanate Curing Agent VESTAGONB1530 (manufactured by Evonik Japan Co., Ltd.): 9 parts by weight
  Red Pigment (manufactured by Dainichiseika Color & Chemicals Mfg. Co., Ltd., Seika Fast Red 1531B: 10 parts by weight The compositions described above are mixed and are dissolved, and are kneaded and pulverized, and thus, clear red powder particles (PC105) are obtained. Then, a polyester resin clear red coating material (PCC105) is obtained by the same method as that of the polyester resin clear red powder coating material (PCC101) except that the red powder particles (PC105) are used.

Furthermore, the volume average particle diameter D50v of the clear red powder coating material particles (PCC105) is 23.3 µm, and the volume particle diameter distribution index GSDV is 1.58. The average circularity is 0.902, and thus, the clear red powder coating material particles have an irregular shape.

Polyester Resin Clear Red Powder Coating Material (PCC106)

A polyester resin clear red powder coating material (PCC106) is obtained by the same method as that of the polyester resin clear red powder coating material (PCC105) except that the amount of the titania particles A as the external additive (the TA oxide particles) is 1.3 parts by weight.

Polyester Resin Clear Red Powder Coating Material (PCC107)

100 parts by weight of the clear red powder particles (PC101), 0.5 parts by weight of the titania particles A, and 0.2 parts by weight of the silica particles E are mixed by using a Henschel mixer at a peripheral speed of 32 m/s for 10 minutes, and then, coarse particles are removed by using a sieve having a mesh size of 45 µm, and thus, a polyester resin clear red powder coating material (PCC107) is obtained.

Polyester Resin Clear Red Powder Coating Material (PCC108)

100 parts by weight of the clear red powder particles (PC101), 0.5 parts by weight of the titania particles A, and 0.5 parts by weight of the silica particles E are mixed by using a Henschel mixer at a peripheral speed of 32 m/s for 10 minutes, and then, coarse particles are removed by using a sieve having a mesh size of 45 m, and thus, a polyester resin clear red powder coating material (PCC108) is obtained.

Examples 101 to 106 and Comparative Examples 101 to 102

Electrostatic powder coating and evaluation are performed by the same method as that in Example 1 except that each of the powder coating materials (PCC101) to (PCC108) is used.

The details and the evaluation results of the examples and the comparative examples are collectively shown in Table 2.

TABLE 2

| | | Powder Coating Material before being Sprayed (New Product) | | | | | |
| | | Powder Particles | | | TA Oxide Particles | | Silica Particles |
| | No. | D50v (µm) | GSDv | Average Circularity | Type | Content Ao (%) | Content (%) |
| --- | --- | --- | --- | --- | --- | --- | --- |
| Example 101 | PCC101 | 6.1 | 1.24 | 0.985 | Titania Particles A | 0.5 | |
| Example 102 | PCC102 | 10.5 | 1.26 | 0.981 | Titania Particles A | 0.5 | |
| Example 103 | PCC103 | 6.1 | 1.24 | 0.985 | Titania Particles A | 0.1 | |
| Example 104 | PCC104 | 6.1 | 1.24 | 0.985 | Titania Particles A | 0.8 | |
| Example 105 | PCC107 | 6.1 | 1.24 | 0.985 | Titania Particles A | 0.5 | 0.2 |

TABLE 2-continued

| | | | | | | | |
|---|---|---|---|---|---|---|---|
| Example 106 | PCC108 | 6.1 | 1.24 | 0.985 | Titania Particles A | 0.5 | 0.5 |
| Comparative Example 101 | PCC105 | 23.3 | 1.58 | 0.902 | Titania Particles A | 0.5 | |
| Comparative Example 102 | PCC106 | 22.3 | 1.58 | 0.902 | Titania Particles A | 1.3 | |

| | | | Smoothness of Coating Film | |
|---|---|---|---|---|
| | Electrostatically Attached Powder Coating Material TA Oxide Particles Content Ac (%) | Variation in Amount of TA Oxide Particles (Ac/Ao) | Surface Roughness Ra of Coating Film of New Product (μm) | Surface Roughness Ra of Coating Film of Collected Product (μm) |
| Example 101 | 0.41 | 0.82 | 0.052 | 0.063 |
| Example 102 | 0.51 | 1.02 | 0.085 | 0.093 |
| Example 103 | 0.096 | 0.96 | 0.092 | 0.1 |
| Example 104 | 0.92 | 1.15 | 0.070 | 0.102 |
| Example 105 | 0.41 | 0.82 | 0.051 | 0.053 |
| Example 106 | 0.41 | 0.82 | 0.053 | 0.057 |
| Comparative Example 101 | 0.38 | 0.76 | 0.067 | 0.125 |
| Comparative Example 102 | 1.62 | 1.25 | 0.120 | 0.190 |

From the results described above, it is found that, in this example, a difference in surface roughness a between the coating film of the new product and the coating film of the collected product is small, and a variation in smoothness of a coating film which occurs at the time of reusing the powder coating material collected without being electrostatically attached to an object to be coated is prevented, compared to the comparative example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic powder coating method, comprising: spraying a charged powder coating material including: (i) powder particles that contain a thermosetting resin and a thermosetting agent, wherein a volume average particle diameter of the powder particles in the powder coating material before being sprayed is from 3 μm to 10 μm, and (ii) an external additive that includes oxide particles containing at least one of titania and alumina to electrostatically attach the powder coating material to an object to be coated, wherein a content Ac of the oxide particles in the powder coating material that is electrostatically attached to the object to be coated and a content Ao of the oxide particles in the powder coating material before being sprayed satisfy a relationship of Expression: $Ao \times 0.80 \leq Ac \leq Ao \times 1.20$, and an amount of the oxide particles is in a range of from 0.01 parts by weight to 5 parts by weight, with respect to 100 parts by weight of the powder particles; and heating the powder coating material that is electrostatically attached to the object to be coated to thereby form a coating film.

2. The electrostatic powder coating method according to claim 1, wherein the content Ac of the oxide particles in the powder coating material that is electrostatically attached to the object to be coated and the content Ao of the oxide particles in the powder coating material before being sprayed satisfy a relationship of Expression: $Ao \times 0.90 \leq Ac \leq Ao \times 1.10$.

3. The electrostatic powder coating method according to claim 1, wherein an average circularity of the powder particles in the powder coating material before being sprayed is greater than or equal to 0.96.

4. The electrostatic powder coating method according to claim 1, wherein the thermosetting resin is a thermosetting polyester resin.

5. The electrostatic powder coating method according to claim 4, wherein a total of an acid value and a hydroxyl value of the thermosetting polyester resin is from 10 mgKOH/g to 250 mgKOH/g.

6. The electrostatic powder coating method according to claim 1, wherein the thermosetting resin is a thermosetting (meth)acrylic resin.

7. The electrostatic powder coating method according to claim 6, wherein a number average molecular weight of the thermosetting (meth)acrylic resin is from 1,000 to 20,000.

8. The electrostatic powder coating method according to claim 1, wherein an amount of the powder coating material attached to a surface to be coated of the object is from 1.5 g/m² to 15.0 g/m².

9. The electrostatic powder coating method according to claim 1, wherein a content of the thermosetting resin is from 20% by weight to 99% by weight with respect to the total content of the powder particles.

10. The electrostatic powder coating method according to claim 1,
   wherein a content of the thermosetting agent is from 1% by weight to 30% by weight with respect to the thermosetting resin.

11. The electrostatic powder coating method according to claim 1,
   wherein the powder particles include a bivalent or higher valent metal ion.

12. The electrostatic powder coating method according to claim 11,
   wherein a content of the metal ions is from 0.002% by weight to 0.2% by weight with respect to the total content of the powder particles.

13. The electrostatic powder coating method according to claim 1,
   wherein the powder particles are core-shell particles.

14. The electrostatic powder coating method according to claim 13,
   wherein a coverage of a shell portion of the powder particles is from 30% to 100%.

15. The electrostatic powder coating method according to claim 13,
   wherein a thickness of a shell portion of the powder particles is from 0.2 μm to 4 μm.

16. The electrostatic powder coating method according to claim 1,
   wherein a volume average particle diameter of the external additive is from 5 nm to 200 nm.

17. The electrostatic powder coating method according to claim 1, wherein the oxide particles contain alumina.

* * * * *